US006480194B1

(12) United States Patent
Sang'udi et al.

(10) Patent No.: US 6,480,194 B1
(45) Date of Patent: Nov. 12, 2002

(54) COMPUTER-RELATED METHOD, SYSTEM, AND PROGRAM PRODUCT FOR CONTROLLING DATA VISUALIZATION IN EXTERNAL DIMENSION(S)

(75) Inventors: Gerald P. Sang'udi, Sunnyvale; Ross A. Bott, Half Moon Bay; Joel D. Tesler, Cupertino, all of CA (US); John R. Hawkes, Mercer Island, WA (US); Rebecca W. Xiong, Cambridge, MA (US); Mario Schkolnick, Mountain View, CA (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/748,548
(22) Filed: Nov. 12, 1996

(51) Int. Cl.⁷ .............................................. G06T 11/20
(52) U.S. Cl. ...................................... 345/440; 345/473
(58) Field of Search ................................ 345/440, 441, 345/473, 474, 475, 419

(56) References Cited

U.S. PATENT DOCUMENTS

| | | | |
|---|---|---|---|
| 3,816,726 A | 6/1974 | Sutherland et al. | 345/427 |
| 4,719,571 A | 1/1988 | Rissanen et al. | 364/300 |
| 4,807,158 A | 2/1989 | Blanton et al. | 364/521 |
| 4,868,771 A | 9/1989 | Quick et al. | 364/578 |
| 4,928,247 A | 5/1990 | Doyle et al. | 364/518 |

(List continued on next page.)

OTHER PUBLICATIONS

Becker, R.A. et al., "Trellis Graphics Displays: A Multi-Dimensional Data Visualization Tool For Data Mining," Presented at KDD'97, Newport Beach, CA, Aug. 1997, 15 pages.

Kohavi, R., "The Power of Decision Tables," Machine Learning:ECML–95 (8$^{th}$ European Conference on Machine Learning Heraclion, Crete, Greece), Apr. 25–27, Springer, 1995, pp. 174–189.

LeBlanc, J. et al., "Exploring N–Dimensional Databases," Proceedings of the First IEEE Conference on Visualization: Visualization '90, IEEE Computer Society Press, San Francisco, CA, Oct. 23–26, 1990, pp. 230–237.

(List continued on next page.)

*Primary Examiner*—Mark Zimmerman
*Assistant Examiner*—Hue Dung X. Cao
(74) *Attorney, Agent, or Firm*—Sterne, Kessler, Goldstein & Fox P.L.L.C.

(57) ABSTRACT

A computer graphics display method and system for controlling data visualization in at least one external dimension is provided which allows better querying and navigation of data in external dimension space. A data visualization is displayed in a first display window. A summary window provides summary information on data for the data visualization across one or more external dimensions. First and second controllers are displayed for controlling the variation of the data visualization in respective first and second external dimensions. A user queries the data visualization in the first and second external dimensions by selecting a point in the summary window. A user navigates through the data visualization in the first and second external dimensions by defining a path in the summary window. Grid points are also displayed in the summary window to facilitate data queries and navigation based on actual data points. The first and second controllers can be first and second sliders, such as, slide buttons, dials, or any other type of input. An animation control panel, including tape-drive controls, a path control, and a speed control, controls an animation of the data visualization over a selected navigation path through external dimension space.

28 Claims, 14 Drawing Sheets

U.S. PATENT DOCUMENTS

| | | | |
|---|---|---|---|
| 4,994,989 A | 2/1991 | Usami et al. | 364/522 |
| 5,043,920 A | 8/1991 | Malm et al. | 364/521 |
| 5,072,395 A | 12/1991 | Bliss et al. | 364/443 |
| 5,150,457 A | 9/1992 | Behm et al. | 345/420 |
| 5,164,904 A | 11/1992 | Sumner | 364/436 |
| 5,201,047 A | 4/1993 | Maki et al. | 395/600 |
| 5,228,119 A | 7/1993 | Mihalisin et al. | 395/118 |
| 5,247,666 A | 9/1993 | Buckwold | 395/600 |
| 5,251,131 A | 10/1993 | Masand et al. | 364/419.08 |
| 5,253,333 A | 10/1993 | Abe | 395/62 |
| 5,282,262 A | 1/1994 | Kurashige | 345/476 |
| 5,295,243 A | 3/1994 | Robertson et al. | 345/460 |
| 5,303,388 A | 4/1994 | Kreitman et al. | 395/159 |
| 5,307,456 A | 4/1994 | MacKay | 345/454 |
| 5,325,445 A | 6/1994 | Herbert | 382/38 |
| 5,418,946 A | 5/1995 | Mori | 395/600 |
| 5,420,968 A | 5/1995 | Johri | 395/133 |
| 5,426,780 A | 6/1995 | Gerull et al. | 395/600 |
| 5,459,829 A | 10/1995 | Doi et al. | 345/452 |
| 5,463,773 A | 10/1995 | Sakakibara et al. | 395/600 |
| 5,467,444 A | 11/1995 | Kawamura et al. | 395/141 |
| 5,479,597 A | 12/1995 | Fellous | 395/154 |
| 5,515,486 A | 5/1996 | Amro et al. | 395/137 |
| 5,519,865 A | 5/1996 | Kondo et al. | 395/600 |
| 5,528,735 A | 6/1996 | Strasnick et al. | 395/127 |
| 5,546,529 A | 8/1996 | Bowers et al. | 395/159 |
| 5,553,163 A | 9/1996 | Nivelle | 382/227 |
| 5,555,354 A | 9/1996 | Strasnick et al. | 395/127 |
| 5,604,821 A | 2/1997 | Ranganathan et al. | 382/236 |
| 5,634,087 A | 5/1997 | Mammone et al. | 395/24 |
| 5,659,731 A | 8/1997 | Gustafson | 395/604 |
| 5,671,333 A | 9/1997 | Catlett et al. | 395/20 |
| 5,671,381 A | 9/1997 | Strasnick et al. | 395/355 |
| 5,675,711 A | 10/1997 | Kephart et al. | 395/22 |
| 5,675,785 A | 10/1997 | Hall et al. | 395/613 |
| 5,675,786 A | 10/1997 | McKee et al. | 395/614 |
| 5,678,015 A | 10/1997 | Goh | 395/355 |
| 5,680,476 A | 10/1997 | Schmidt et al. | 382/159 |
| 5,694,524 A | 12/1997 | Evans | 395/77 |
| 5,696,964 A | 12/1997 | Cox et al. | 395/605 |
| 5,701,466 A | 12/1997 | Yong et al. | 395/611 |
| 5,706,495 A | 1/1998 | Chadha et al. | 395/602 |
| 5,724,573 A | 3/1998 | Agrawal et al. | 395/606 |
| 5,727,199 A | 3/1998 | Chen et al. | 395/606 |
| 5,732,230 A | 3/1998 | Cullen et al. | 395/339 |
| 5,737,487 A | 4/1998 | Bellegarda et al. | 395/25.9 |
| 5,748,852 A | 5/1998 | Mahler | 395/61 |
| 5,787,274 A | 7/1998 | Agrawal et al. | 395/613 |
| 5,861,891 A | 1/1999 | Becker | 345/433 |
| 5,864,839 A | 1/1999 | Bourgoin | 707/1 |
| 5,877,775 A | 3/1999 | Theisen et al. | 345/440 |
| 5,896,139 A | 4/1999 | Strauss | 345/440 |
| 5,946,002 A * | 8/1999 | Lowry | 345/474 |
| 6,004,134 A | 12/1999 | Marcus et al. | 434/45 |
| 6,026,399 A | 2/2000 | Kohavi et al. | 707/6 |
| 6,061,072 A * | 5/2000 | Rouet et al. | 345/474 |
| 6,075,530 A | 6/2000 | Lucas et al. | 345/339 |

OTHER PUBLICATIONS

Mihalisin, T. et al., "A Robust Visual Access and Analysis System for Very Large Multivariate Databases," *Computing Science and Statistics*, vol. 26, Computationally Intensive Statistical Models, Proceedings of the 26th Symposium on the Interface, Jun. 15–18, 1994, pp. 426–430.

Venables, W.M. and Ripley, B.D., *Modern Applied Statistics with S–PLUS*, Springer–Verlag, 1994, pp. 413–425.

Spiegelhalter, D.J. and Knill–Jones, R.P., "Statistical and Knowledge–based Approaches to Clinical Decision–support Systems, with an Application in Gastroenterology," Journal of the Royal Statistical Society, vol. 147, Part 1, Royal Statistical Society, 1984, pp. 35–77.

Wnek, J. and Michalski, R.S., "Hypothesis–Driven Constructive Induction in AQ17–HCI: A Method and Experiments," Machine Learning, vol. 14, No. 1, Kluwer Academic, Jan. 1994, pp. 139–168.

Carlbom et al., "A Hierarchical Data Structure for Representing the Spatial Decomposition of 3–D Objects", *IEEE Computer Graphics & Applications*, Apr. 1985, pp. 24–31.

Carlbom et al., "Planar Geometric Projections and Viewing Transformations" *Computing Surveys*, vol. 10, No. 4, Dec. 1978, pp. 465–502.

Beveaux, T., "Virtual Reality Gets Real", *New Media*, (Jan. 1993), pp. 32–35.

Ahlberg et al., "IVEE: An Information Visualization & Exploration Environment," Proceedings of Information Visualization '95, 1995, pp. 66–73.

Becker et al., "Smooth Transitions between Bump Rendering Algorithms," *Computer Graphics Proceedings*, Annmual Conference Series, 1993, pp. 183–190.

Becker et al., "Unsteady Flow Volumes," Proceedings of Visualization '95. 1995, pp. 329–335.

Blinn, James F., "Light Reflection Functions for Simulation of Clouds and Dusty Surfaces," *Computer Graphics*, vol. 16, No. 3, Jul. 1982, p. 116–124.

Crawfis et al., "Texture Splats for 3D Scalar and Vector Field Visualization," Proceedings of IEEE Visualization '93, 1993, pp. 261–265.

Crawfis et al., "Vector Field Visualization," *Computer Graphics and Applications*. vol. 14, 1994, pp. 50–56.

Inselberg et al., "Parallel Coordinates: A Tool for Visualizating Multidimensional Geometry," Proceedings of Visualization '90, 1990, pp. 361–378.

Laur et al., "Hierarchical Splatting: A Progressive Refinement Algorithm for Volume Rendering," *Computer Graphics*, vol. 25, No. 4, Jul. 1991, pp. 285–288.

Levoy, Marc, "Volume Rendering: Display of Surfaces from Volume Data," *IEEE Xomputer Graphics and Applications*, vol. 8, No. 5, May 1988, pp. 29–37.

Martin et al., "High Dimensional Brushing for Interactive Exploration of Multivariate Data," Proceedings of Visualization '95, 1995, pp. 271–278.

Max et al., "Bump Shading for Volume Textures," *IEEE Computer Graphics and Applications*, Jul. 1994, 18–20.

Max et al., "Flow Volumes for Interactive Vector Field Visualization," Proceedings of Visualization '93, 1993, pp. 19–24.

Sabella, Paolo, "A Rendering Algorithm for Visualizing 3D Scalar Fields," *Computer Graphics*, vol. 22, No. 4, Aug. 1988, pp. 51–58.

Stein et al., "Sorting and Hardware Assisted Rendering for Volume Visualization," *IEEE*, 1995, pp. 83–89.

Van Wijk et al., "HyperSlice," Proceedings of Visualization '93, 1993, pp. 119–125.

Westover, Lee, "Footprint Evaluation for Volume Rendering," *Computer Graphics*, vol. 24, No. 4, Aug. 1990, pp. 367–376.

Wilhelms et al., "A Coherent Projection Approach for Direct Volume Rendering," *Computer Graphics*, vol. 25, No. 4, Jul. 1991, pp. 275–284.

Wong et al., "Dual Multiresolution HyperSlice for Multivariate Data Visualization," IEEE Symposium on Information Visualization, Oct. 1996, pp. 74–75.

Graves, G.L., "NASA's Virtual Reality", *New Media*, (Jan. 1993), p. 36–38.

Graves, G.L., "Invasion of the Digital Puppets", *New Media*, (Jan. 1993), p. 38–40.

Yavelow, C., "3–D Sound Found in Space", *New Media*, (Jan. 1993), pp. 40–41.

Johnson, Brian and Ben Shneiderman, "Tree–Maps: A Space–Filling Approach to the Visualization of Hierarchical Information Structures", *IEEE Visualization Proceedings '91*, Oct. 1991, pp. 284–291.

Structural Dynamics Research Corporation News Release, "SDRC Announces Software Translator Between CADAM and I–DEAS", Mar. 31, 1992.

Jacobson, Bob, "The Ultimate User Interface", *BYTE*, Apr. 1992, pp. 175, 176, 178, 180, and 182.

Clarkson, Mark A., "An Easier Interface", *BYTE*, Feb. 1991, pp. 277, 278, 280, 281, and 282.

Radding, Alan, "PC GIS: Expect Gain But Also Some Pain", *Computerworld*, Feb. 17, 1992, p. 89.

Hilderbrand, Carol, "GIS Vital In Utility's Duel with Competitor", *Computerworld*, Jan. 20, 1992, p. 43.

Anthes, G.H., "GIS Eases Redistricting Worry", *Computerworld*, Oct. 7, 1991, p. 65.

Alexander, Michael, "GIS Sprouting Corporate Wings", *Computerworld*, Jul. 22, 1991, p. 20.

Wilder, C., "Virtual Reality Seeks Practicality", *Computerworld 26 (17)*, Apr. 27, 1992, p. 26.

Fairchild, Kim M., Steven E. Poltrock and George W. Furnas, "SemNet: Three–Dimensional Graphic Representations of Large Knowledge Bases", *Cognitive Science and its Applications for Human–Computer Interaction*, Guindon, Ed., 1988, pp. 201–233.

*Precision Visuals International Limited*, "Summary of PV–WAVE Point & Click Visual Data Analysis Software", 1991.

Flanagan, William G., "Cyberspace Meets Wall Street", *Forbes*, Jun. 22, 1992, pp. 164, 165, and 168.

Grinstein, G. et al., "Visualization for Knowledge Discovery", *Intl. J. Intelligent Systems 7*, 1992, pp. 637–648.

Fuller, J.E., Using Autocad, 3d Ed., Chapter 17, *Viewing 3–D Drawings*, 1989, pp. 17–1–17–14, and Tutorial, pp. 19–15–19–16, Delmar Publishers, Inc., Albany, NY 12212.

Alexander, M., "Visualizing Cleared–Off Desktops", *Computerworld 25 (18)*, May 6, 1991, p. 20.

Benedikt, M., ed., *Cyberspace First Steps*, The MIT Press, Cambridge, Massachusetts (1992), pp. 1–436.

Forrest, D., "Seeing Data in News Ways", *Computerworld*, Jun. 29, 1992, pp. 85–86.

Newquist, H.P., "Virtual Reality's Commercial Reality", *Computerworld 26 (3)*, pp. 93–95.

"Atlas Software: A New Dimension in Data Management", advertisement, Atlas Software, Strategic Mapping, Inc., San Jose, CA 95117 (page and date unknown).

"News: What's New—Business Software", *BYTE*, Mar. 1992, p. 78.

"A Map for All Reasons", advertisement, Strategic Mapping, Inc., San Jose, CA 95117 (page and date unknown).

News Release, Company: Information Builders, Dateline: Pacific Palisades, CA, "Remarkable 3D Main–Frame Graphics Available For PC Users", Feb. 1985.

News Release, Company: Information Builders, Inc., Datelne: Palm Desert, CA, "Information Builders Announces Release 3.0 of PC/Focus DBMS", Jun. 1, 1987.

News Release, Company: Honeywell Bull, Dateline: Bilerica, MA "Relational Software System Increases Integration, Productivity for Honeywell Bull Users", Jul. 17, 1987.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Atlanta, GA, "Alliant Debuts New Class of System The Visual Supercomputer", Aug. 2, 1988.

News Release, Company: Virtus, Dateline: Pleasanton, CA, "Individual Software Introduces Training for Microsoft Excel 3.0 Windows and Macintosh Versions", Jul. 31, 1991.

News Release, Company: Virtus Corporation, Dateline: Cary, NC, "Virtus Walkthrough Releases Quicktime Component", Nov. 1, 1991.

News Release, Company: Alias Research, Dateline: Toronto, Ontario, "Alias Ships Sketch!, Freeform 3D Illustration and Design Program", Nov. 15, 1991.

News Release, Company: Structural Dynamics Res. Intl. Business Machines, Dateline: Boston MA, "Alias Sketch (TM) Resumes Shipping: Freeform 3D Illustration and Design Tool", Feb. 19, 1992.

Pollack, A., "The 2–D Screen Gives 3–D World" New York Times (date unknown).

Foley et al., "Computer Graphics: Principals and Practice", Second Edition, Addison–Wesley Publishing Co., 1990, pp. 731–734 and color plate III.23.

Aha, D.W. et al., "Instance–Based Learning Algorithms," *Machine Learning*, vol. 6, No. 1, pp. 37–66 (Jan. 1991).

Almuallim, H. and Dietterich, T.G., "Learning Boolean Concepts in the Prescence of Many Irrelevant Features," *Artificial Intelligence*, vol. 69, Nos. 1–2, pp. 279–305 (Sep. 1994).

"Angoss Software Announces Knowledge Studio Data Mining Solution," http://www.pathfinder.com/@@xIEk0gYAVjbJZjKM/money/latest/press/PW/19970ct27/92, Angoss Software Corporation, pp. 1–2, Oct. 1997.

"Angoss Software's KnowledgeSEEKER(TM) Compatible With SAS Institute," http://www.newswire.ca/releases/September1997/18/c3915.html, pp. 1–2, Canada Newswire, Sep. 1997.

Breiman et al., Classification and Regression Trees, Wadsworth International Group, entire book (1984).

Cestnik, B., "Estimating Probabilities: A Crucial Task in Machine Learning," Proceedings of the 9th European Conference on Artifical Intelligence, pp. 147–149 (Aug. 1990).

"Companies in Data Mining and Knowledge Discovery," http://kdnuggets.com/companies.html, pp. 1–4, Last updated: Oct. 31, 1997.

Cormen, T.H., et al., *Introduction to Algorithms*, The MIT Press, pp. 263–280 (1990).

Cover and Thomas, *Elements of Information Theory*, Wiley Interscience, entire book, 1991.

Desarathy, B.V., "Nearest Neighbor (NN) Norms: (NN) Patterns Classification Techniques," (IBL), *IEEE Computer Society Press*,pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Duda, R. and Hart, P., *Pattern Classificatin and Scene Analysis*, Wiley, entire book, (1973).

Fairchild, K.M., "Information Management Using Virtual Reality–Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Friedman, J. H. et al., "Lazy Decision Trees," Proceedings of the Thirteenth National Conference on Artificial Intelligence, AAAI Press and the MIT Press, vol. 1, pp. 717–724 (1996).

Good, I.J., *The Estimation of Probabilities: An Essay on Modern Bayesian Methods*, pp. xi–xii, MIT Press, pp. 1–79, (1965).

"IBM Digs Deep for Data Mining 'Gold'," http://www.software.ibm.com/data/intelli–mine/factsheet.html, pp. 1–8, IBM Corporation, Copyright 1997.

"KD Mine: Data Mining and Knowledge Discovery," http://kdnuggets.com/index_kdm.html, p. 1, Knowledge Discovery Nuggets, Copyright 1997, Last updated: Oct. 31, 1997.

Kittler, J., "Feature Selection and Extraction," *Handbook of Pattern Recognition and Image Processing*, Chapter 3, pp. 59–83, Academic Press, Inc., 1986.

Knuth, A., *The Art of Computer Programming*, Addison–Wesley, vol. 2, pp. 506–550 (1973).

Kohavi, R., "Scaling Up the Accuracy of Naive–Bayes Classifiers: a Decision–Tree Hybrid," In *Data Mining and Visualization*, Silicon Graphics, Inc., from The Second International Conference on Knowledge Discovery and Data Mining (1996).

Kohavi, R., "A Study of Cross–Validation and Bootstrap for Accuracy Estimation and Model Selection," Proceedings of the 14th International Joint Conference on Artifical Intelligence, Stanford University, 1995.

Kohavi, R. and John, G., "Wrappers for Feature Subset Selection," http://robotics.stanford.edu/~{ronnyk.gjohn}, May 20, 1997.

Kohavi, R. and Li, C., "Oblivious Decision Trees, Graphs, and Top–Down Pruning," Proceedings of the 14th International Joint Conference on Artificial Intelligence, Chriss S. Mellish (Ed.), Morgan Kaufmann Publishers, Inc., pp. 1071–1077 (1995).

Kohavi, R. and Sommerfield, D., "Feature Subset Selection Using the Wrapper Model: Overfitting and Dynamic Search Space Topology," Proceedings of the First International Conference on Knowledge Discovery and Data Mining, pp. 192–197 (Aug. 1995).

Kohavi, R. et al., "Data Mining using MLC++: A Machine Learning Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Induction of Selective Bayesian Classifiers," Proceedings of the Tenth Conference on Uncertainty in Artificial Intelligence, Morgan Kaufmann Publishers, Inc., pp. 399–406 (Jul. 1994).

Langley, P. and Sage, S., "Oblivious Decision Trees and Abstract Cases," *Working Notes of the AAAI–94 Workshop on Case–Based Reasoning*, AAAI Press, pp. 113–117 (1994).

Langley, P., et al., "An Analysis of Bayesian Classifiers," Proceedings of the Tenth National Conference on Artificial Intelligence, pp. 223–228 (Jul. 1992).

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1&18 (Sep. 1990).

Michie, et al., *Machine Learning, Neural and Statistical Classification*, Ellis Norwood United, entire book (1994).

Murthy, S. et al., "Randomized induction of oblique decision trees," Proceedings of the Eleventh National Conference on Artificial Intelligence, AAI Press/MIT Press, pp. 322–327 (1993).

"Other Web Sites for Data Mining and Knowledge Discovery," http://kdnuggets.com/websites.html. pp. 1–3, Last updated: Sep. 10, 1997.

Quinlan, J.R., *C4.5: Programs for Machine Learning*, Morgan Kaufmann Publishers, Inc., pp. 17–26 (1993).

Quinlan, J.R., "Induction of Decision Trees," *Machine Learning*, vol. 1, No. 1, pp. 81–106 (1986).

Rendell, L. and Seshu, R., "Learning hard concepts through constructive induction: framework and rationale," *Computational Intelligence*, vol. 6, No. 4, pp. 247–270 (Nov. 1990).

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "A Conservation Law for Generalization Performance," Machine Learning: Proceedings of the Eleventh International Conference, Morgan Kaufmann Publishers, Inc., pp. 259–265 (1994).

Shavlik, J.W. and Dietterich, T.G. (Eds.), *Readings in Machine Learning*, Morgan Kaufmann Publishers, Inc., entire book, (1990).

"S*i*ftware: Tools for Data Mining and Knowledge Discovery," http://kdnuggets.com/siftware.html, pp. 1–2, Last updated: Oct. 31, 1997.

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perceptron Trees: A Case Study in Hybrid Concept Representation," Proceedings of the Seventh National Conference on Artificial Intelligence, Morgan Kaufmann, vol. 2, pp. 601–606 (Aug. 1988).

Weiss, S.M. and Kulikowski, C.A., "Classification and Prediction Methods from Statistics, Neural Nets, Machine Learning, and Expert Systems," *Computer Systems That Learn*, Morgan Kaufmann Publishers, Inc., entire book, (1991).

MineSet User's Guide, Silicon Graphics Computer Systems, 1996, made available to public less than one year prior to Nov. 12, 1996.

Greenwood, J., "Countdown to the Cybermarket," Financial Post Magazine, Mar., 1994, pp. 26–32.

Boyl, J. et al., "Design of a 3D user interface to a database," submitted to Database Issues for Data Visualization Workshop, Jul., 1993, pp. 1–9.

Gershon, N. et al., "Visualizations's New Tack: Making Sense of Information," IEEE Spectrum, Nov., 1995, pp. 38–47 and 55.

"Mineset Awards," http://www.sgi.com/Products/software/MineSet/awards.html. p. 1, (Jan. 9, 1998).

"Silicon Graphics MineSet Wins Bronze Miner Award," http://www.sgi.com/Headlines/1997/October/mineset_release.html, pp. 1–2, (Oct. 1, 1997).

"The 1997 Database Dozen," by D. Stodder, http://www.dbpd.com/96dozen.htm. pp. 1–2, (1996 or 1997).

"A Dozen Companies on the Rise," http://www.dbpd.com/seconddz.htm, pp. 1–9, (Miller Freeman Inc. 1997).

"MineSet 2.0 for Data Mining and Multidimensional Data Analysis," by C. Hall, http://www.sgi.com/Products/software/MineSet/DMStrategies/, pp. 1–12, (1997). (originally appeared in Sep. 1997 issue of *Data Management Strategies*, Copyright 1997 Cutter Information Corp).

Amsbury, W., *Data Structures from Arrays to Priority Queues*, Wadsworth Publishing, Belmont, CA, pp. viii and 331–336, Copyright 1985.

Date et al., *A Guide to SQL/DS*, Addison–Wesley Publishing, New York, NY, pp. xiii and 97–118, Copyright 1989.

Hecht–Nielsen, R., *Neurocomputing*, Addison–Wesley Publishing, New York, NY, pp. ix–xiii and 175–201, Copyright 1990.

Hsiao et al., "Supervised Textured Image Segmentation Using Feature Smoothing and Probabilistic Relaxation Techniques", *IEEE Transactions on Pattern Analysis and Machine Intelligence*, vol. 11, No. 12, pp. 1279–1292, Dec. 1989.

Robert et al., "Continuously Evolving Classification of Signals Corrupted by an Abrupt Change", *IEEE–IMS Workshop on Information Theory and Statistic*, p. 97, Oct. 1994.

Santos–Victor et al., "A Computer Vision System for the Characterization and Classification of Flames in Glass Furnaces", *IEEE Transactions on Industry Applications*, vol. 29, No. 3, pp. 470–478, Jun. 1993.

Taxt et al., "Segmentation of Document Images", *IEEE Transactions on Pattern Analysis and Machine Intelligence*, vol. 11, No. 12, pp. 1322–1329, Dec. 1989.

* cited by examiner

US 6,480,194 B1

COMPUTER-RELATED METHOD, SYSTEM, AND PROGRAM PRODUCT FOR CONTROLLING DATA VISUALIZATION IN EXTERNAL DIMENSION(S)

BACKGROUND OF THE INVENTION

1. Field of the Invention

The present invention relates generally to computer graphics display, and more specifically to a graphics display tool for controlling data visualization.

2. Related Art

Computer graphics display systems have long been used to visualize data. Depending upon the type of data involved, a data visualization is displayed to identify data content, characteristics, properties, relationships, trends, and any other aspect of the data. For example, business and scientific data is often visualized through charts, graphs, histograms, and figures. Virtual reality (VR) data visualizations represent data using display models, such as, information landscapes, hierarchies, cones, walls, and trees.

A data visualization, however, represents a snapshot of data that is fixed with respect to external dimension(s) not represented in the data visualization itself. For example, consider a company's annual sales data reported in a simple bar chart. A bar can be provided for each retail store in the company. The heights of the bars represent the annual sales for the respective retail stores. In this case, time is one external dimension. The bar chart represents annual sales only for a particular year. Sales data over other time intervals, such as, sales in prior years or monthly sales data, are not visible in the single bar chart display.

A "slider" is used to vary the display of data in an external dimension. A slider is often a button or dial which a user moves along a scale to set the data visualization to a different value or range of values in the external dimension For the annual sales bar chart discussed above, a slider can be used to extend the bar chart to cover sales made in a preceding year. Such sliders, however, are ineffective navigation instruments. Using sliders alone leaves the user blind to any variations in the data over the external dimensions. A user only receives notice of the change in data over the external dimension after a slider has been set. In addition, a slider can control only one external dimension at a time. Even if two sliders are provided, a user can only move one slider at a time, thereby, precluding independent simultaneous navigation in more than one external dimension.

A graphics display tool for controlling or varying data visualization in at least one external dimension is needed, which allows better querying and navigation of data in external dimension space. Summary information about how data for a data visualization varies across external dimension space is needed to guide data queries and navigation. An ability to query and navigate a data visualization across one, two, or more external dimensions in a simultaneous and independent manner is needed.

SUMMARY OF THE INVENTION

The present invention provides a method, system, and program product for controlling data visualization in at least one external dimension, which allows better querying and navigation of data in external dimension space. Summary information about how data in the data visualization varies across one or more external dimensions is provided in a summary window to guide a user when querying and navigating the data. Through inputs to the summary window, a user can query and navigate a data visualization across one, two, or more external dimensions in a simultaneous and independent manner. External controller(s) are provided for the summary window to further control data queries and navigation across external dimension space. An external controller can be a slider, dial, or other type of Graphical-User Interface (GUI), keyboard, or peripheral input.

The user makes a query for a data visualization covering a data point in external dimension space by selecting a corresponding point in the summary window. The data visualization will then be displayed in a first display window covering actual and/or interpolated data at the selected point. In a snap-on-grid mode, a data visualization will be displayed based on one or more actual data points closest to the selected point input by the user. Grid points can be optionally displayed in the summary window during the snap-on-grid mode to visually aid a user in identifying actual data points across the external dimension space.

The user navigates through the data visualization across external dimension space by defining a navigation path in the summary window. The data visualization will then be displayed as an animation following the selected navigation path. A navigation path can be established in either of three main ways. First, a navigation path can be defined by selecting start and end points in the summary window. Second, a user can trace a free-form navigation path in the summary window to direct free-form navigation. Lastly, predefined paths for animation can also be selected or provided as default animation modes.

Again in a snap-on-grid mode, grid points, corresponding to actual data points, can be optionally displayed in the summary window to facilitate navigation. The snap-on-grid mode can also be turned on and off algorithmically so that a navigation path is forced or not forced through actual data points.

An animation control panel controls an animated display of the data visualization along a navigation path. The animation control panel includes tape-drive-type controls, such as forward, reverse, and stop controls, for controlling data visualization during animation. The animation control panel further includes a path slider and a speed slider. The path slider allows a user to reset the position of the animation along the navigation path. The speed slider allows a user to adjust the speed of the animation along the path.

Any single data visualization or animation can be based on actual data points and/or interpolated data points. Known interpolation techniques can be used to obtain interpolated data points based on the actual data points. In this way, for example, an animation can proceed along a navigation path that includes actual and interpolated data point. This enables a user to observe changes in the data visualization more easily and smoothly. An automatic smooth stopping feature allows a user to observe an animation over interpolated data points, but when the animation is stopped or paused, the data visualization continues or reverses to the nearest actual data point. This allows the user to navigate easily to areas of interest and to detect trends in the data using interpolated values, but to perform closer study only upon data visualizations representing actual data points.

Likewise, summary window information can be drawn based on actual and/or interpolated data. By providing a summary window, the present invention allows the user to preview data in external dimension space before a data visualization is mapped to new external dimension values or ranges. In this way, a user is better equipped to target data queries and navigation across external dimension space. After an input is made to the summary window, the user is free to focus on changes in a still or animated data visualization.

In a first preferred embodiment, a computer graphics display method, system, and program product are provided for varying a scatter data visualization in external dimension space (covering one or two external dimensions) through a graphical user-interface.

In a second preferred embodiment, a computer graphics display method, system, and program product are provided for varying a map data visualization in external dimension space (covering one or two external dimensions) through a graphical user-interface.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or fictionally similar elements. Additionally, the left-most digit(s) of a reference number identifies the drawing in which the reference number first appears.

DETAILED DESCRIPTION OF THE EMBODIMENTS

TABLE OF CONTENTS

Figure 1:
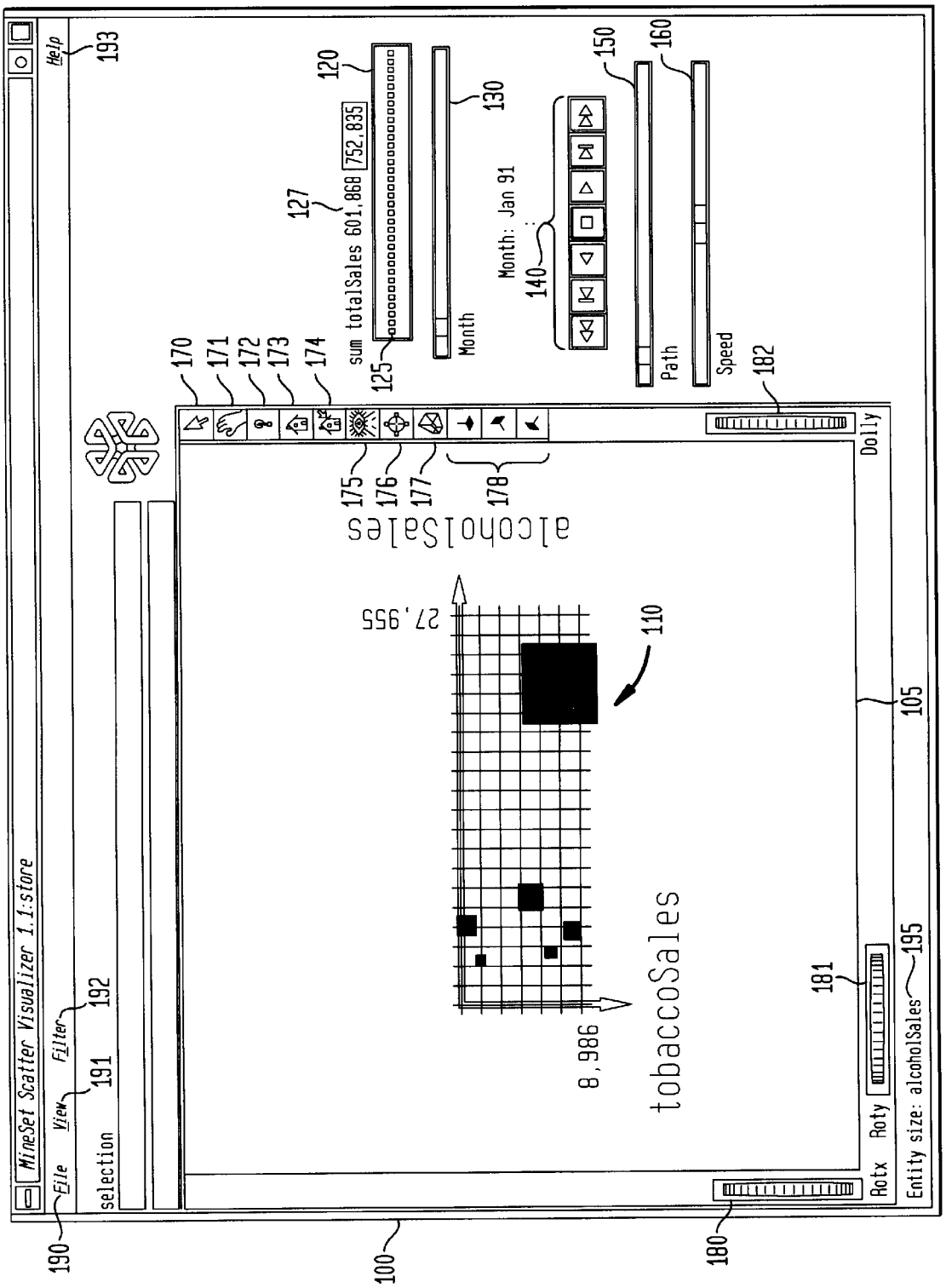
FIG. 1 is a screen display of a scatter data visualization varied in one external dimension according to one embodiment of the present invention.

1. Overview of the Invention
2. Terminology
3. Example Environment
4. Scatter Data Visualization Tool Embodiment
5. External Dimension Space
   a. One External Dimension
   b. Multiple External Dimensions
      i. Data Queries
      ii. Navigation
      iii. Snap-On-Grid Mode
6. Example GUI Computer Environment
7. Example Network Environment
8. Generating a Configuration File
9. Scatter Data Visualization Display Tool Options
10. Filter Panel
11. Map Data Visualization Tool Embodiment
12. Example Map Data Visualizer Tool Implementation
   a. Generating a Configuration File
   b. Map Data Visualization Display Tool Options
13. Representation of Null Data
14. Conclusion 1. Overview of the Invention The present invention is directed to a data visualization tool for controlling or varying data visualization in at least one external dimension that allows better querying and navigation of data in external dimension space. Summary information highlighting how data varies with respect to one or more external dimensions is provided in a summary window to guide data queries and navigation. An ability to query and navigate data across one or more external dimensions in a simultaneous and independent manner is achieved. With this summary window, a user can preview data highlights in external dimension space prior to and before a data visualization is formed. A user can better target data queries and navigation paths through the summary window. During animation the user is free to focus on changes in the data visualization across external dimension space. An animation control panel provides flexible control of animation along a navigation path.

2. Terminology

"Data visualization" refers to any visualization of data for a computer graphic display. Any type of data (e.g., business, scientific, educational, mathematical), data attributes, and variables, can be visualized through graphical attributes in the data visualization. The data visualization can be a graph, chart, spreadsheet, figure, histogram, grid, map, virtual reality (VR) data visualization and/or any other type of data display. The VR data visualization can be based on any type of VR display model mapping data attributes to VR graphical attributes. For example, landscapes, hierarchies, perspective walls, cones, and trees can be used as VR display models. Instead of a computer graphics data visualization, the data visualization can also be a physical model or any other apparatus or means for representing data.

"External dimension space" refers to one or more external dimensions, also called external variables. This external dimension space consists of one or more independent, external data variables having value ranges not covered in an immediate data visualization.

"Summary information" displayed in the summary window refers to any graphical attribute that summarizes data (that is, a data attribute or any combination of data attributes) for the data visualization over external dimension space. For example, the values for a data attribute or a combination of data attributes across one or more external dimensions can be represented as a function of color in the summary window. In this way, points of maximum and minimum rates of change in the data visualization across external dimension space are determined easily by viewing the summary window. A user can easily query and/or navigate to different areas of interest by selecting specific colored regions within the summary window. Height in a landscape can also be used as a graphical attribute for the summary window. Hills and valleys then highlight areas of change in the data across external dimension space.

3. Example Environment

The present invention is directed to system and method for controlling or varying data visualization in external dimension space. The present invention is implemented as a computer graphics display tool, also called a "data visualization tool," through software, firmware, and/or hardware on a computer system. The data visualization tool can be provided on any type of computer graphics workstation, processor, multiprocessor, computer network, personal stand-alone computer, or any other computer graphics processing environment or application. Two preferred data visualization tool embodiments using the present invention, a scatter data visualization tool and a map data visualization tool, are described in detail below.

The present invention is described in terms of an example computer graphics display data visualization tool environment. Description in these terms is provided for convenience only. It is not intended that the invention be limited to application in this example environment. In fact, after reading the following description, it will become apparent to a person skilled in the relevant art how to implement alternative environments of the invention.

4. Scatter Data Visualization Tool Embodiment

FIG. 1 shows a screen display 100 of a preferred embodiment of a scatter data visualization tool according to the present invention. Screen display 100 includes a first display window 105 and a summary window 120. A data visualization 110 is displayed within the first display window 105. In his embodiment, data visualization 110 consists of a "scatter" data visualization. A scatter data visualization plots graphical objects, also called entities, along one or more axes.

Preferably, the data visualization 110 is generated from a data file based on a configuration file. The data and configuration files can be generated using a tool manager or input directly by the user. The configuration file describes the format of input data and how the data is to be graphically displayed to form data visualization 110. The data file represents data extracted from a data source, such as, a relational or non-relational database, and formatted for use by the data visualization tool. The operation of data and configuration files is described below with respect to FIG. 4.

Summary window 120 includes summary information on the data for data visualization 110 over a first external dimension. This summary information highlights the variation of the data visualization 110 over a first external dimension. A first controller 130 is provided for varying the data visualization 110 in the first external dimension. Grid points 125 are displayed in the summary window 120. These grid points aid querying and navigation of data in the summary window 120 as described below with respect to FIG. 3.

An animation control panel 135 is provided for controlling animation of the data visualization 110. Tape drive controls 140, path slider 150, and speed slider 160 are provided for controlling the animation of the data visualization 110 in the first external dimension. The operation of the animation control panel 135 is described in further detail below with respect to the specific data set covered in FIG. 1.

External controls surround the first display window 105. These external controls consist of an array of viewer buttons 170–177, and a set of thumb wheels 180–182. Arrow button 170 toggles a select mode. Select mode permits a user to highlight entities in the first display window 105. In select mode, the cursor shape is an arrow. When the user moves positions the arrow cursor over an entity and selects the entity, specific data for that entity is displayed. Hand button 171 toggles a grasp mode. In grasp mode, the cursor shape is a hand. By moving the hand in grasp mode, a user can rotate, zoom, and pan the data visualization 110 in the first display window.

Viewer help button 172 brings up a help window describing the external controls governing the display view in the display window 105. Home button 173 moves the viewpoint of the first display window to a home location. The home location can be an initial location set automatically at start-up or a viewpoint stored during operation of the data visualization tool when a user clicks the Set Home button 174.

View All button 175 permits a user to view the entire data visualization 110 keeping the angle of view displayed when the View All button 175 is pressed. For example, to gain an overhead view of the entire data visualization 110, the field of view (also called a camera view) is rotated to look down on entities in the data visualization 110. Clicking the View All button 175 then moves a viewpoint providing an overhead view of the entire data visualization.

Seek button 176 moves the viewpoint to a point or object selected after a user clicks the Seek button 176. Perspective button 177 turns a 3-D perspective view on and off. Toggling on the 3-D perspective, displays objects in the data visualization 110 in geometric perspective such that closer objects appear larger and farther objects appear smaller near a horizon. Additional controls 178 can also be used to provide top, bottom, front, back, and/or side (left/right) views of the data visualization 110.

Vertical Rotx thumb wheel 180 rotates the data visualization 110 display about an x-display screen axis, in other words, up and down. Horizontal Roty thumb wheel 181 rotates the data visualization 110 display about a y-display screen axis, in other words, left and right around a center point. Vertical Dolly thumb wheel 182 moves the viewpoint forward and backward from the user. This movement magnifies and minifies the data visualization 110, thereby, providing more or less detail in the display. When 3-D perspective is toggled off, the Dolly thumb wheel 182 becomes a Zoom thumb wheel controlling camera height angle.

Four pull-down menus 190–193 access all of the data visualization tool functions. File menu 190 has commands for creating, opening, or re-opening a new configuration file and exiting the data visualization tool. View menu 191 drops down to provide three command options: Show Window Decoration, Show Animation Panel, and Show Data Points. Show Window Decoration lets a user hide or show the external controls around the first display window 105. Show Animation Panel lets a user hide or show the animation control panel 135. Show Data Points toggles a "snap-on-grid" mode that lets a user hide or show the data points in the summary window 120. Separate controls, e.g. buttons, or menu or keyboard commands (not shown), can be provided for controlling separately the visual and/or algorithmic operation of the snap-on-grid mode. The grid points can be turned on and off to visually display or not display the grid points, regardless of whether an animation or navigation is forced through the actual data points. In addition, snap-on-grid mode can be algorithmically controlled (i.e. toggled on and off) to force or not force animation or navigation through the actual data points.

Filter menu 192 brings up a filter panel. As described in more detail with respect to FIG. 7, a filter panel lets a user input filter criteria to reduce the number of entities displayed in the data visualization 110. By judiciously selecting filter criteria, a user can fine-tune the data visualization 110 to emphasize specific information or remove extraneous data.

5. External Dimension Space a. One External Dimension

As mentioned above, data visualization 110 consists of a "scatter" data visualization. A scatter data visualization plots graphical objects, also called entities, along one or more axes. Three types of data variables are used to define a scatter data visualization: entity variables, dependent variables, and independent variables. "Entity variables" are represented as graphical objects in the scatter data visualization. The unique values of an entity variable become graphical objects in the scatter data visualization display.

In FIG. 1, "store type" is an entity variable represented by different colored graphical objects in the scatter data visualization 110. "Dependent variables" are numeric attributes of the entities. Dependent variables can be represented as dimensions or axes in the scatter data visualization 110 and/or by corresponding graphical attributes of the graphical objects. For example, in FIG. 1, tobacco sales and alcohol sales (plotted along respective axes in the scatter data visualization 110) are dependent variables. Wine sales, represented by entity size, is also a dependent variable. Independent variables represent "external" dimensions over which the dependent variables change. Time, specifically three years divided into 36 months, is an external variable in FIG. 1.

To illustrate the operation of the present invention, FIG. 1 is shown with example data related to retail tobacco and alcohol sales in a given month (January). As explained in a legend 195, data visualization 110 consists of a two dimensional graph of tobacco sales and alcohol sales for different store type entities. These store type entities include beverage stores, convenience stores, dairy stores, department stores, discount stores, drug stores, and food stores each of which is distinguished by color coding. The size of an entity is a function of its total alcohol sales.

Thus, data visualization 110 only indicates a snapshot of total tobacco and alcohol sales for different store entities in January. This snapshot does not reveal total sales in February through December. In this sense, time divided in monthly units represents an external dimension for data visualization 110.

Summary window 120 contains summary information on the total alcohol and tobacco sales over the external dimension time. In this case, the external dimension space covers a range of one year from January to December. A color value is assigned as a function of the total tobacco and alcohol sales across the twelve months of the first external dimension. The color variations in the summary window 120 highlight changes in the sum total of tobacco and alcohol sales across the first external dimension range (January 1991–December 1993). A color legend 121 is provided to show the correlation between color and total sales. In this case, white represents minimum total sales of $601,868 dollars. Black represents maximum total sales of $752,835. More detail in the color legend can be added depending upon a particular application.

By viewing the summary window 120 information, a user can better make data queries and navigate to form the data visualization 10 at a month in the external dimension space which is of greatest interest. To make a data query, a user can select a point within the summary window 120 using any type of graphical user interface input, such as, a keyboard command, a mouse click, voice command, or a touch screen input. In response to the user's input, the data visualization 110 is formed covering actual and/or interpolated data at the selected month. Alternatively, the user can move a slider control in the slider 130 to select a point in the summary window 120.

The user navigates through the data visualization 110 across external dimension space by defining a navigation path in the summary window 120. The data visualization 110 will then be displayed as an animation following the selected navigation path. A navigation path can be established in either of four main ways. First, a navigation path can be defined by selecting start and end points in the summary window 120. Second, a user can trace a free-form navigation path in the summary window 120 to direct free-form navigation. Third, a path can be created by selecting a point in the summary window, e.g., by clicking a mouse button when the cursor is at the selected point. Slider 130 then can be used to move the point in a straight horizontal path. Lastly, predefined paths for animation, e.g. paths covering minimum to maximum points of external dimensions, can also be selected or provided as default animation modes.

Any single data visualization 110 or animation thereof, can be based on actual data points and/or interpolated data points. Known interpolation techniques can be used to obtain interpolated data points based on the actual data points. In this way, for example, an animation can proceed along a navigation path that includes actual and interpolated data points. This enables a user to observe changes in the data visualization 110 more easily and smoothly. An automatic smooth stopping feature allows a user to observe an animation over interpolated data points, but when the animation is stopped or paused, the data visualization 110 continues or reverses to the nearest actual data point. This allows the user to navigate easily to areas of interest and to detects trends in the data using interpolated values, but to perform closer study only upon data visualizations representing actual data points.

An animation control panel 135 controls an animation of the data visualization 110. During animation, the data visualization 110 plays like a movie scanning actual and/or interpolated data over a selected navigation path through the external dimension time. During animation mode, the data visualization 110 can be automatically changing along a pre-determined animation path covering different months, i.e., from Jan. to Dec. Tape drive controls 140 can be used to fast-forward, rewind, stop, or pause an automatic variation of the data visualization 110 that occurs in an animation display mode. In the example of FIG. 1, the tape drive controls 140 have buttons that change the display of data visualization 110 to a desired month in seven modes: fast-forward, single frame forward, forward, pause, reverse, single frame reverse, fast-reverse.

Path slider 150 is used to reset the position of the animation along a selected navigation path. In this way, the user can jump to a different point along the path and resume viewing the animation. Speed slider 160 enables a user to set the speed at which the animation progresses, that is, the rate at which the data visualization 110 changes to cover a different month.

Summary window 120 further includes grid points 125 for aiding data queries and navigation in a "snap-on-grid" mode. For example, graphical user interface inputs, such as, mouse clicks, need only be made at a point close to a grid point in the summary window 120. The data visualization 110 will then be updated to reflect the month at the grid point closest to the point selected. Likewise, a user can define a start and endpoint for navigation path within the summary window 120. During animation, the actual navigation path will follow the grid point closest to the selected start point and a grid point closest to the selected endpoint. By tracking grid points corresponding to actual data points, the user observes an animation of the data visualization which is most accurate. This feature is especially helpful for making data queries and navigating through two dimensions in external dimension space as will be described below with respect to FIGS. 2A and 2B. To avoid unnecessary duplication, a more detailed description on how to make data queries, select or define navigation paths through the summary window, and how to control animation is described below with respect to multiple external dimensions.

b. Multiple External Dimensions

Figure 2A:
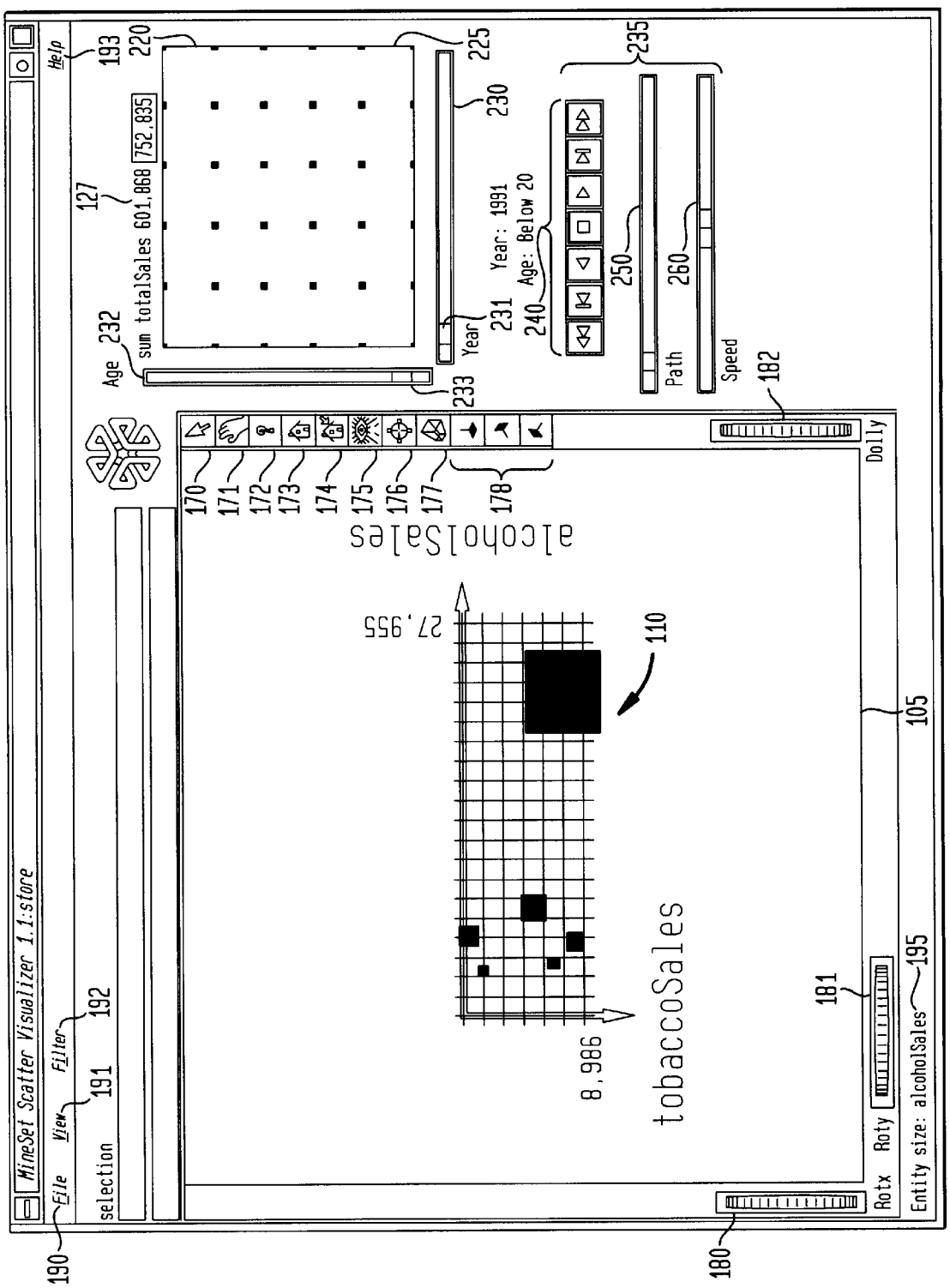
FIG. 2A is a screen display of a scatter data visualization varied in two external dimensions according to the present invention.
Figure 2B:
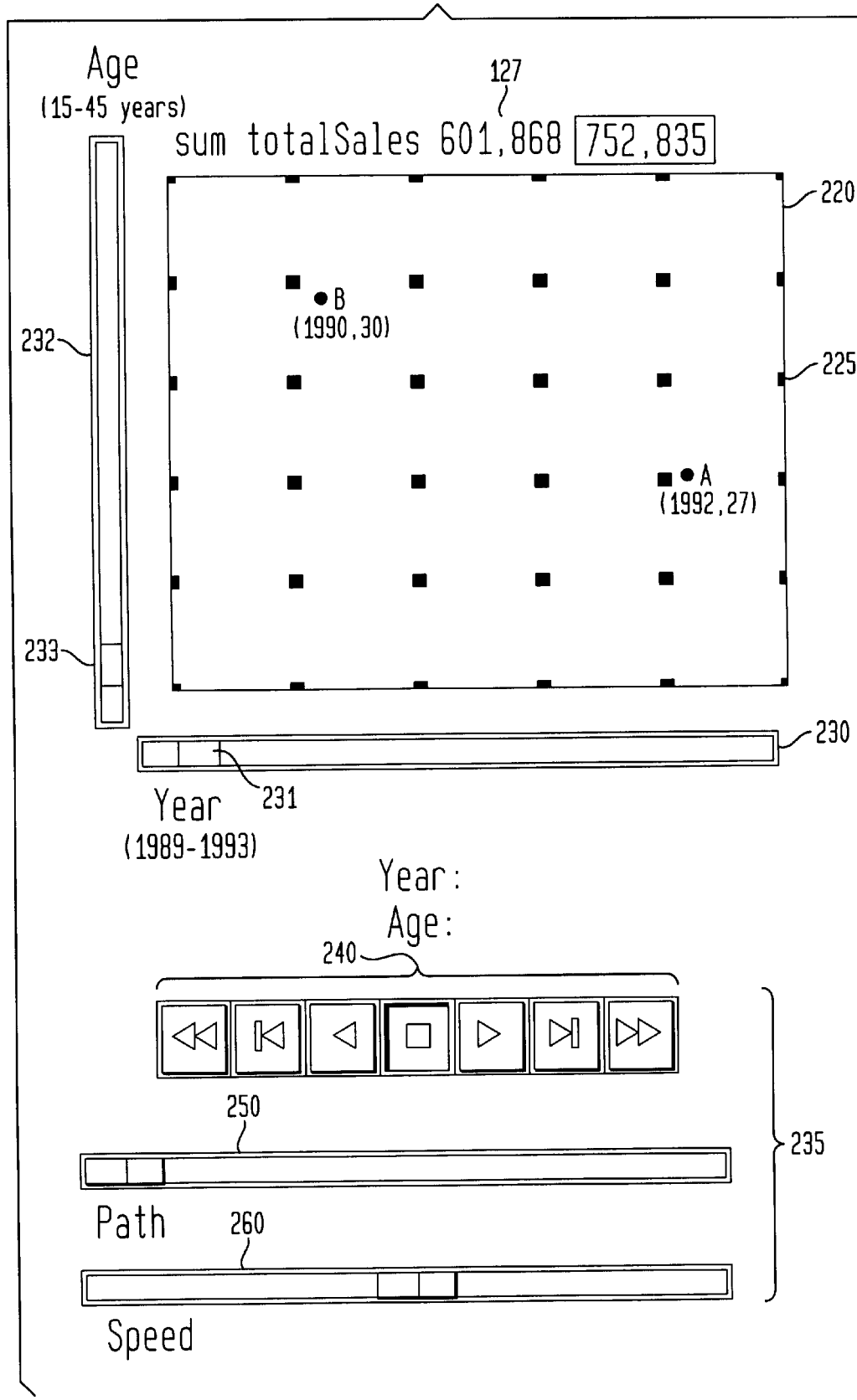
FIG. 2B shows querying and navigation of data through a summary window in the screen display of FIG. 2A.

In general, the number of external dimensions (one, two or more) depends upon the number of independent variables in a data set used to form a data visualization. FIGS. 2A and 2B show a second example of a scatter data visualization tool according to the present invention covering data in two external dimensions: year and age of purchaser. Summary window 220 includes summary information representing the variation of a data visualization 110 over first and second external dimensions. The first external dimension includes data related to a first independent variable, namely, sales years 1989–1993. The second external dimension includes data related to a second independent variable, namely, age of purchaser, 15 to 45 years of age.

A first controller 230 is provided for varying the data visualization 210 in the first external dimension. A second controller 232 is provided for varying the data visualization 210 in the second external dimension. An animation control panel 235 includes tape drive controls 240, a path slider 250, and a speed slider 260 for controlling the animation of the data visualization 210 in the first and second external dimensions. Grid points 225 are displayed in the summary window 220. These grid points aid querying and navigation of data in the summary window 220 as described below with respect to FIG. 2B.

As shown in FIG. 2B, summary window 220 contains summary information on the data in data visualization 210 over the entire external dimension space: years (1989–1993) and age of purchaser (15–45 years old). The color variations in the summary window 220 highlight changes in the total sales attributed to different years and purchaser ages.

i. Data Queries

Figure 3:
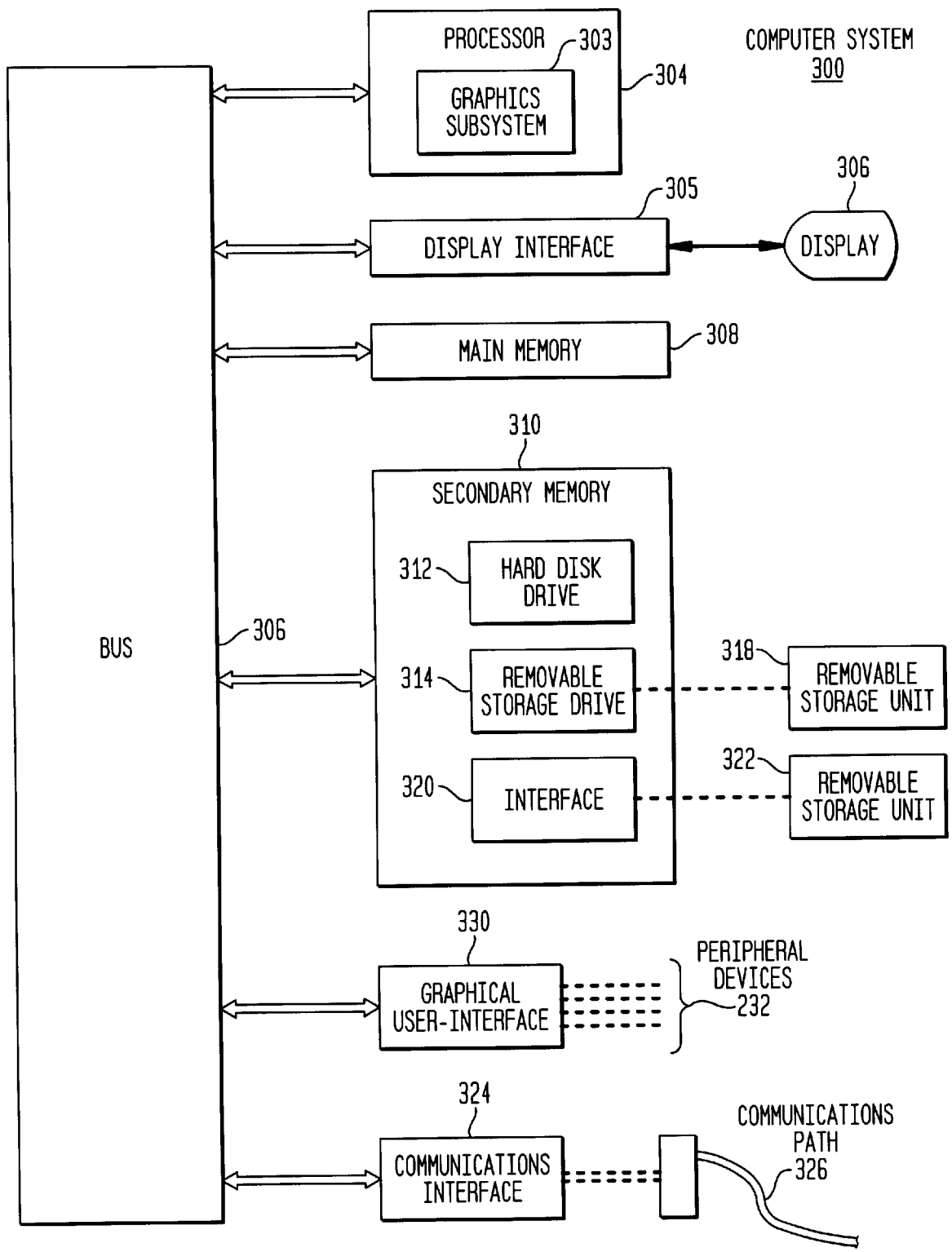
FIG. 3 is an example computer system for implementing the present invention.

By viewing the summary window 220 information, a user can better focus data queries and navigation in the data visualization 210 over both external dimensions. Through a graphical user interface input, such as, a keyboard command, a mouse click, voice command, or a touch screen input, a user can select a point within the summary window 220 in which to view the data visualization 210 in the external time and age dimensions. For example, a cursor can be moved to select point A to simultaneously query data for the year 1992 and age 27 as shown in FIG. 3. In response to this query, data visualization 210 will be updated to display data at the specific external dimension coordinate points selected, namely, tobacco and alcohol sales in the year 1992 for purchasers age 27. Actual and/or interpolated data closest to point A can be used to form data visualization 210.

Alternatively, a user can query data by moving slider controls 231, 233 to vary the external dimensions at which data visualization 210 is displayed. The summary window 220 allows the user to preview specific regions of interest in which to move the slider controls 231, 232, thereby, allowing the user to target the data query more efficiently.

ii. Navigation

In addition, to making specific data queries, a user can navigate through actual and/or interpolated data points along a navigation path. Navigation paths can be defined in any of four ways as described above: selecting a predetermined path, defining start and end points, tracing a free-form path, or selecting a point then moving a slider. The data visualization 210 will then display data as an animation covering the external dimension coordinate points along the selected navigation path. Predetermined navigation paths can be selected through a pull-down window command or a separate control button or panel (not shown). For example, one pre-defined navigation path might represent a diagonal across the summary window. In this case, data visualization 210 is displayed as an animation of actual and/or interpolated data points covering tobacco and alcohol sales in 1989 to persons of age 15 to sales in 1993 to persons of age 45. Data in the data visualization 210 can be covered cumulatively (that is, summed over the range of years and/or ages of people) or non-cumulatively through the navigation path.

During any animation, tape drive controls 240 can be used to fast-forward, rewind, stop, or pause the automatic variation of the data visualization 210 along a path. The tape drive controls 240 can speed, slow, or freeze the display of data visualization 210 at a desired year and age. In an animation display mode, the data visualization 210 can be automatically reset to a new position along a pre-determined path covering different years and/or ages using path slider 250. Speed slider 260 permits a user to set a specific speed at which the animation progresses.

More flexible navigation is provided through the summary window 220. A user can define any path through the summary window 220 by tracing a free form path or by setting start and end points (A, B). For example, when a start point A is selected, the data visualization 210 will then display data covering the external dimension coordinate values (actual and/or interpolated) at point A, i.e., tobacco and alcohol sales in the year 1992 by 27 year-olds. To navigate along a path, the user traces a path through the summary window 220 in a free-form manner. This can be done, for example, by dragging and clicking a mouse. Alternatively, the user can select a start point and then move one or more of the slide controls 231,232 to direct navigation in a straight line more easily. As described above, the data visualization 210 displays data corresponding to the start point A and is progressively updated (cumulatively or non-cumulatively) to reflect the data along a specified navigation path from start point A until an end point B is reached.

In another mode of animation, both the start and end points A,B are selected and/or entered based on the summary window 220. The data visualization 210 then automatically begins to display data corresponding to the start point A (tobacco and alcohol sales in 1992 to 27 year-olds) and progressively displays data along a path until the end point B is reached (tobacco and alcohol sales in 1990 to 30 year-olds). During animation the user is free to concentrate on trends in the data visualization 210. This navigation path between start and end points is automatically generated and can have any shape. For example, the path can be a series of straight line segments between actual data points. Preferably, as described below, the path tracks actual data points. Curve-fitting and other statistical techniques can be used to form a smooth navigation path across actual and/or interpolated data points. Preferably, the path connects adjacent or diagonally adjacent grid points between start and end points.

As described earlier, during any type of navigation, tape drive controls 240 can be used to fast-forward, rewind, stop, or pause the changing display of the data visualization 210. Path slider 250 resets the animation to a new point along the path. The speed of the animation can be controlled by through speed slider 260. An optional automatic smooth stopping feature automatically continues or reverses animation to the nearest actual data point when the stop tape drive control or path slider 250 is pressed and released. A path can be extended automatically by clicking a middle mouse button or providing another equivalent input during animation.

iii. Snap-On-Grid Mode

Summary window 220 further includes grid points 225 for aiding data queries and navigation in a "snap-on-grid" mode. These grid points 225 can correspond to actual data points. Grid points 225 can be visually toggled on and off. Navigation can also be algorithmically turned on and off to force or not force a navigation path through actual data points. For example, when grid points 225 are visually displayed and snap-on-grid mode is algorithmically on, as shown in FIG. 2B, a graphical user interface input to the summary window that queries data need only be made at a point close to a grid point in the summary window. The data visualization 210 will then be updated to reflect the actual data at a grid point (year, age) closest to the point selected by the user.

Likewise, for navigation in a snap-on-grid mode, the actual navigation path can be determined by automatic movement from the grid point closest to the selected start point and a grid point closest to the selected endpoint. In this way, the navigation path is easily selected and defined by the user, yet the path taken correlates with actual data points.

Pull-down menus and/or popup windows can also be employed in any of the above embodiments to facilitate selection of navigation paths and start and end points. Bookmarks identifying particular points or paths in the external dimension space can also be stored and selected through menu-driven, keyboard, voice, and/or mouse commands.

6. Example GUI Computer Environment

FIG. 3 is a block diagram illustrating an example environment in which the present invention can operate. The environment is a computer system 300 that includes one or more processors, such as processor 304. The processor 304 is connected to a communications bus 306. Various software embodiments are described in terms of this example computer system. After reading this description, it will be apparent to a person skilled in the relevant art how to implement the invention using other computer systems and/or computer architectures.

Computer system 300 includes a graphics subsystem 303. Graphics subsystem 303 can be implemented as one or more processor chips. The graphics subsystem 303 can be included as part of processor 304 as shown in FIG. 3 or as a separate graphics engine or processor. Graphics data is output from the graphics subsystem 303 to the bus 306. Display interface 305 forwards graphics data from the bus 306 for display on the display unit 306. This graphics data includes graphics data for the screen displays 100 and 200 as described above.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc., which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 can also include a communications interface 324. Communications interface 324 allows software and data to be transferred between computer system 300 and external devices via communications path 326. Examples of communications interface 324 can include a modem, a network interface (such as ethernet card), a communications port, etc. Software and data transferred via communications interface 324 are in the form of signals which can be electronic, electromagnetic, optical or other signals capable of being received by communications interface 324, via communications path 326. Note that communications interface 324 provides a means by which computer system 300 can interface to a network such as the Internet.

Graphical user interface module 330 transfers user inputs from peripheral devices 332 to bus 306. These peripheral devices 332 can be a mouse, keyboard, touch screen, microphone, joystick, stylus, light pen, or any other type of peripheral unit. These peripheral devices 332 enable a user to operate and control the data visualization tool of the present invention as described above.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 3. In this document, the term "computer program product" is used to generally refer to removable storage unit 318 or a hard disk installed in hard disk drive 312. These computer program products are means for providing software to computer system 300.

Computer programs (also called computer control logic) are stored in main memory and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312, or communications interface 324. Alternatively, the computer program product may be downloaded to computer system 300 over communications path 326. The control logic (software), when executed by the processor 304, causes the processor 304 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

7. Example Network Environment

Figure 4:
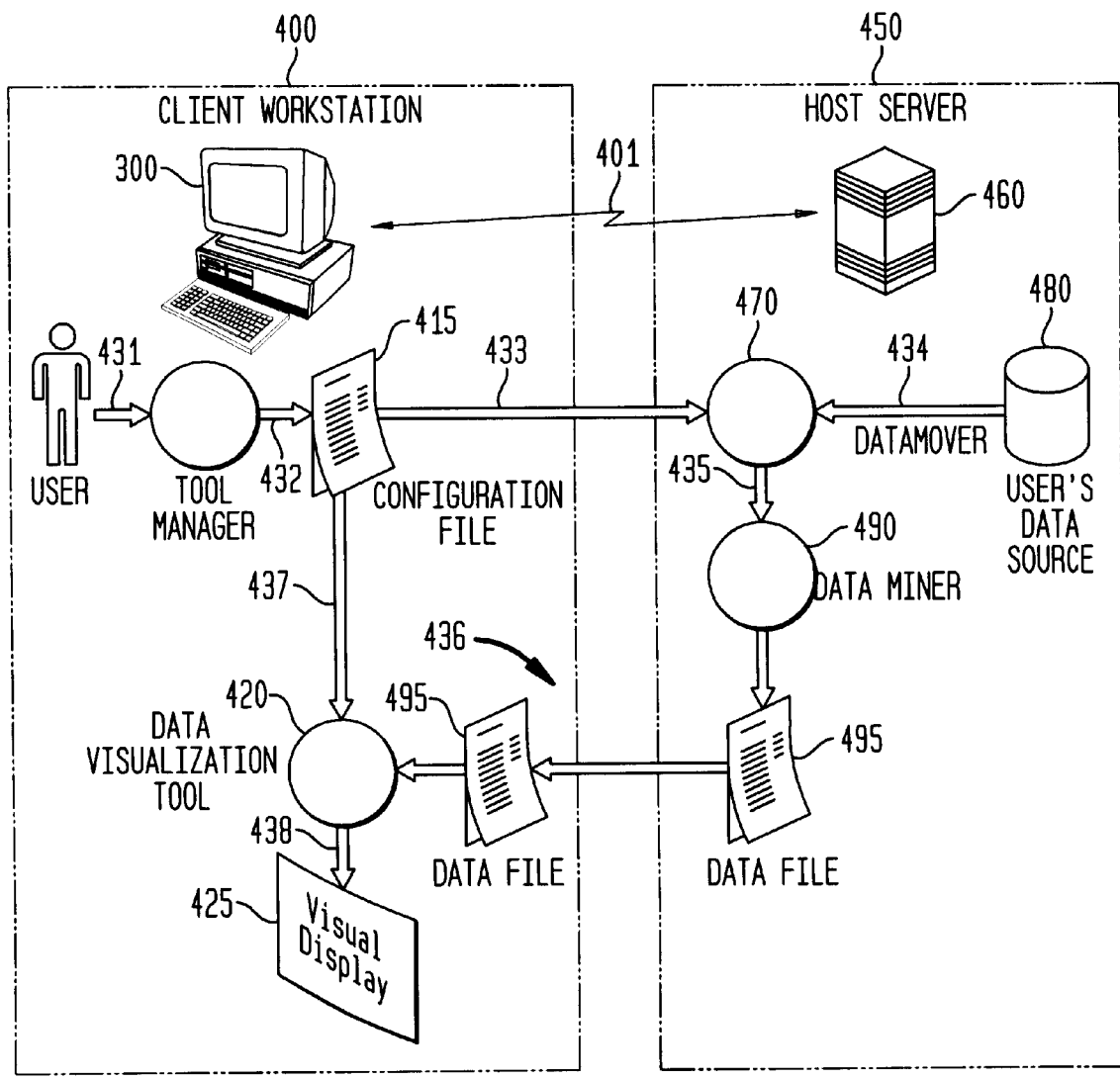
FIG. 4 is an example client/server architecture implementing the present invention.

FIG. 4 further illustrates an overall client/server network environment in which a data visualization tool according to the present invention operates. The network environment described herein is illustrative only and is not necessary to practicing the present invention. Both the scatter and map data visualization tools described herein do not require a network environment.

A client workstation 400 communicates over a data link 401 with a host server 450 as part of a local area network (LAN), campus-wide network, wide-area-network (WAN), or other network type configuration. Any data communication protocol can be used to transport data.

The client workstation 400 includes a computer system 300 as described above with respect to FIG. 3. The computer system 300 runs a tool manager 410 for managing operation of a data visualization tool 420 output on visual display 425. Preferably, tool manager 410 and data visualization tool 420 are software algorithms executed on computer system 300. The host system 450 includes a host processor 460 and a data source 480. Data mover 470 and data miner 490 are included at the host server 450, and preferably, are implemented in software executed by the host processor 460.

Figure 5:
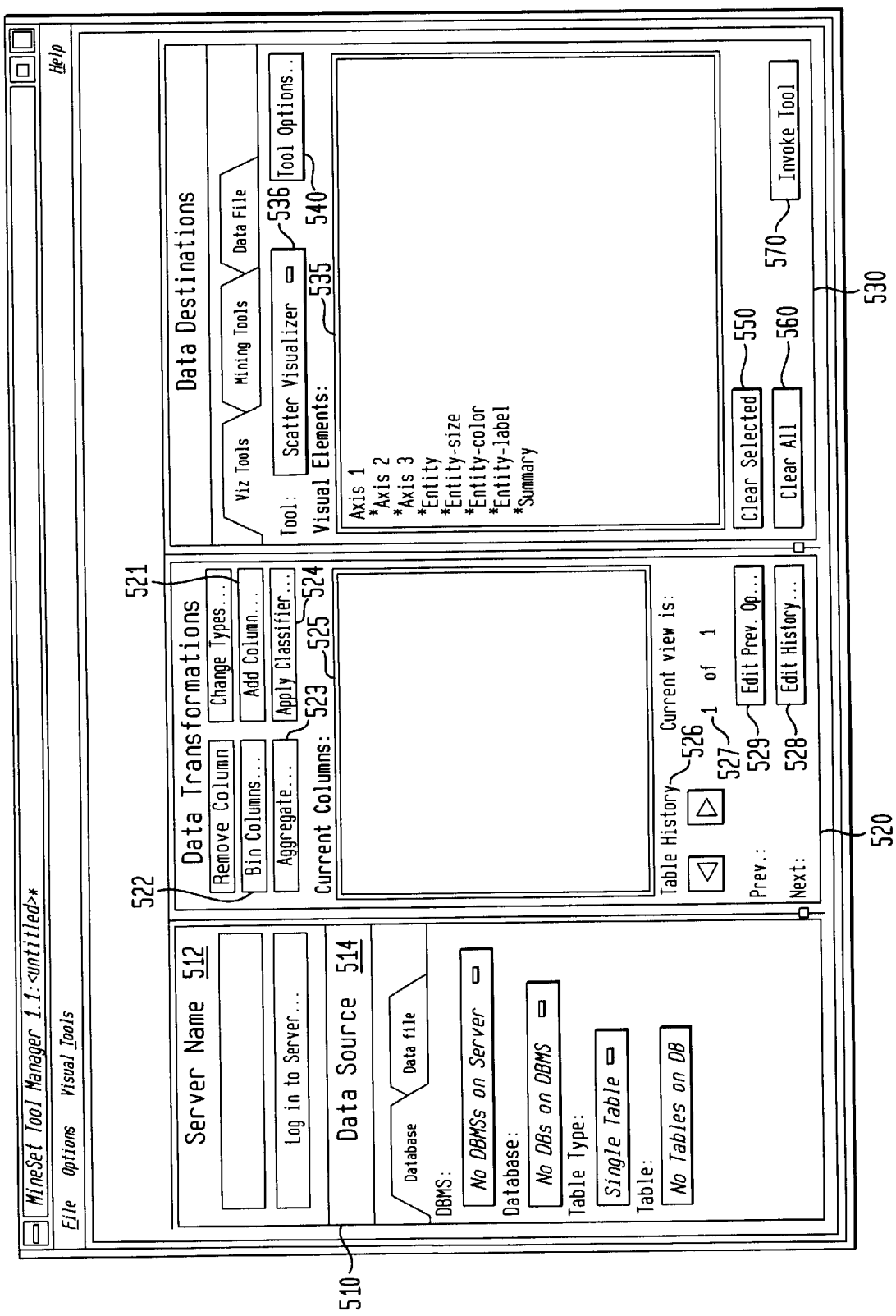
FIG. 5 shows data panels for constructing a configuration file for a scatter data visualization according to the present invention.
Figure 6:
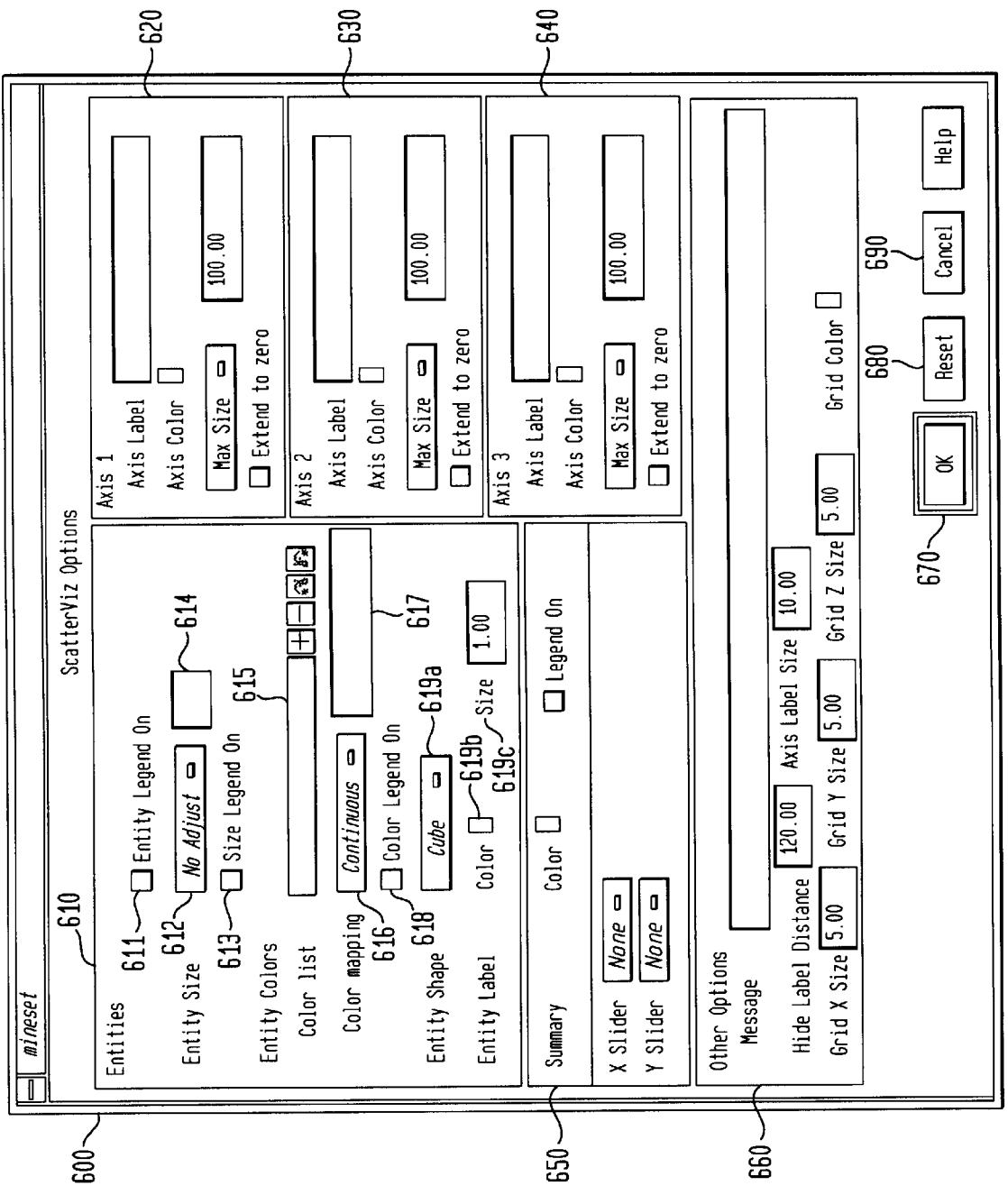
FIG. 6 shows a dialog box for changing scatter data visualization tool default parameters according to the present invention.

FIG. 4 further illustrates the flow of a data visualization tool execution sequence through steps 431–437. First, a user logs onto the client workstation 400 and opens tool manager 410 (step 431). Through the tool manager 410, the user can select and configure a scatter data visualization tool as described above. A configuration file 415 must be set which identifies the content to be displayed in a data visualization and appropriate external dimension ranges. To facilitate this process, predefined preference panels, templates and/or data palettes can be accessed through menu-driven commands and pop-up display windows to permit the user to easily define the content of a data visualization and appropriate external dimension ranges. FIG. 5 shows data manipulation panels 510, 520, 530 that permits a user to construct a configuration file 415 by defining mapping requirements for data. FIG. 6 shows an Options dialog box 600 that permits a user to change parameters for the scatter data visualization tool from default values. Tool manager 410 then generates a configuration file 415 defining the content of the data visualization and scope of external dimension space (step 432). FIGS. 5 and 6 are described in further detail below.

The configuration file is sent over data link 401 to the host server 450 (step 433). A copy of the configuration file 415 is also stored at the client workstation 420 for use by the data visualization tool 425 (step 437). At the host server 450, the data mover 470 extracts data from the data source 480 corresponding to the configuration file 415 (step 434). The data miner 490 receives extracted data from the data mover 470 and generates a data file 495 (step 435). Data miner 490 then sends the data file 495 to the client workstation 400 (step 436).

Finally, in step 438, the data visualization tool 420 uses the data file 495 to generate a data visualization in a first display window and to generate summary information on data across external dimension space in a summary window, as described above.

8. Generating a Configuration File

As shown in FIG. 5, data panels 510, 520, 530 are used to simplify the task of constructing a configuration file 415 for a scatter data visualization tool.

For brevity, only main functions of panels 510–530 are highlighted here. Other functions can be added as would be obvious to one skilled in the art given this description. In panel 510, server name window 512 identifies a server name containing data to be analyzed. Data source window 514 identifies particular databases and data files to used in a data visualization.

Panel 512 is used to define data transformations to be performed on the data before mapping the data to visual elements. Most operations are applied to columns of data. For example, Add Column option 521 lets a user create a new column based on other columns, e.g. totalSales= alcoholSales+tobaccoSales. Bin Columns option 522 is a data transformation where numerical values in a column are grouped into ranges, e.g., grouping ages into 5-year age groups. Other data transformation operations such as aggregating or classifying data, data ranges, or columns of data can be performed (options 523, 524).

Current Columns window 525 lists the columns available for mapping to visual elements after the current data transformations have been applied. Initially, this is the set of columns in the original data. The selected data transformations can add, remove, or modify one or more columns.

Successive data transformations form a "history." The Table History arrow buttons 526 let a user move back and forth in this history. Current Columns window 525 and Current View indicator 527 reflect a user's current position in the table history. Edit History option 528 brings up a new window where the entire history is displayed visually allowing edits, insertions, or removal of data transformations. Edit Prev Op option 529 lets a user edit the previous transformation.

Window 535 lists visual elements requiring mapping. These visual elements include items defining axes, entities, and summary information. Optional items are preceded by an asterisk. Axis 1 lets a user assign a dependent variable to a first axis displayed in a scatter data visualization. Assigning a second dependent variable to a second axis (Axis 2) produces a 2-D chart. Assigning a third dependent variable to a third axis (Axis 3) produces a 3-D chart. Entity is an item used to uniquely identify the entities in the scatter data visualization. Entity-size, entity-color, and entity-label are items used to define data represented by graphical attributes of the entities. The summary item is used to define the data attribute or combination of data attributes representing the summary information in a summary window.

For example, data visualization 210, as described above, can be set-up through data panels 510–530 by assigning alcohol sales to Axis 1 and tobacco sales to Axis 2. In this case, Entity is a column listing different store types. Entity-size is a data field for alcohol sales data. Entity-color is a data field identifying store type. Entity-label is a data field identifying text for a label displayed with the entity (optional and not used in data visualization 210). Summary is a data field identifying the data attributes or combination of data attributes, e.g., the weighted sum of tobacco and alcohol sales, forming the summary information represented graphically as a function of red shading in summary window 220.

Control buttons 536–570 are also included in panel 500. Scatter Visualizer button 536 indicates the scatter data visualization tool is invoked. Tool Options button 540 displays the Options dialog box 600 described in more detail below. Clear Selected Mapping button 550 clears a selected axis, entity, or summary data assignment mapping. Clear All Mapping button 560 clears all axis, entity, and summary mapping data assignments. Invoke Tool button 570 can be pressed after a configuration file is saved to see the scatter data visualization corresponding to the saved configuration file.

Wile panels 510–530 reduce the work in creating a configuration file, a configuration file 415 can be constructed manually using a text editor.

9. Scatter Data Visualization Display Tool Options

FIG. 6 shows an Options dialog box 600 that permits a user to change scatter data visualization tool default values. The dialog box 600 provides four basic options for entities (window 610), axes (windows 620–640), summary information (window 650), and other tool options (window 660). An OK button 670 permits a user to save selected changes to default parameters and exit the box 600. Reset Options button 680 permits a user to reset changes in parameters in box 600 to initial default parameters. Cancel button 690 permits a user to exit box 600 without saving any changes to default parameters.

Entities options window 610 lets a user specify a number of display options governing the display of entities and entity graphical attributes in a scatter data visualization. For example, a user can check whether a entity-legend, e.g., legend 195 in FIG. 1, is displayed or hidden (box 611). With regards to entity size, a user can scale the entity to a maximum size, a scale size, or a default (no adjust) size (box 612). The scale, if any, is indicated in box 614. A user can also check whether a entity-size legend is displayed or hidden (box 613). Entity shape, e.g. cubes, bars, or diamonds can be selected (box 619*a*).

Entity color options 615–618 let a user control the colors in which entities are displayed. Color names or components for entities can be entered directly into box 615. Alternatively, color switches and other color tools can be displayed allowing a user to browse and select a color more easily. Color names preferably follow the X window system convention, e.g., "green," "Hot Pink," and "#77ff42," are valid color entries. As would be apparent to one skilled in the art, "#rrggbb" is a form of specifying red, green, and blue color components in hexadecimal values: pure saturation is represented by ff; a lack of color is represented by 00.

Color mapping for entities can be defined as continuous or discrete color changes (box 616). The color changes covers entity color mapping range values entered in box 617. For example, consider when "red" and "green" are entered for entities in Color List to Use box 615 and color mapping values 0 to 100 are input to box 617. If Discrete color mapping is selected at box 616, the data visualization shows all entities with values of less than 100 in red and those greater than or equal to 100 in green. If Continuous color mapping is selected at box 616, the data visualization shows all entities with values of less than or equal to 0 completely in red, those entities greater than or equal to 100 completely in green, and those entities between 0 and 100 as shadings from red to green.

Box 618 lets a user check whether a color legend is displayed or hidden. Entity label color and size can be set through options 619*b* and 619*c*, respectively.

Axes options windows 620–640 permit a user to define the following for each respective axis: an axis label, an axis color, a size of axis (maximum size, scale size, or no adjustment size), a size value or range, and whether the axis should include zero.

Summary Options window 650 permits a user to define parameters for displaying summary information on independent variables in external dimension space. A user can specify the color used in a summary window to represent summary information. A user can specify whether a summary legend is displayed or hidden. Finally, a user can display whether one or more sliders, e.g., X and Y sliders, are displayed.

Other Options window 660 permits a user to set the following options: specify a message statement to be displayed when an entity is selected, control the size of the entity labels, control the distance at which entity labels become hidden, control the size of axis labels, specify grid color, and specify spacing between x,y,z grid lines (Grid X Size, Grid Y Size, GridZ Size).

10. Filter Panel

Figure 7:
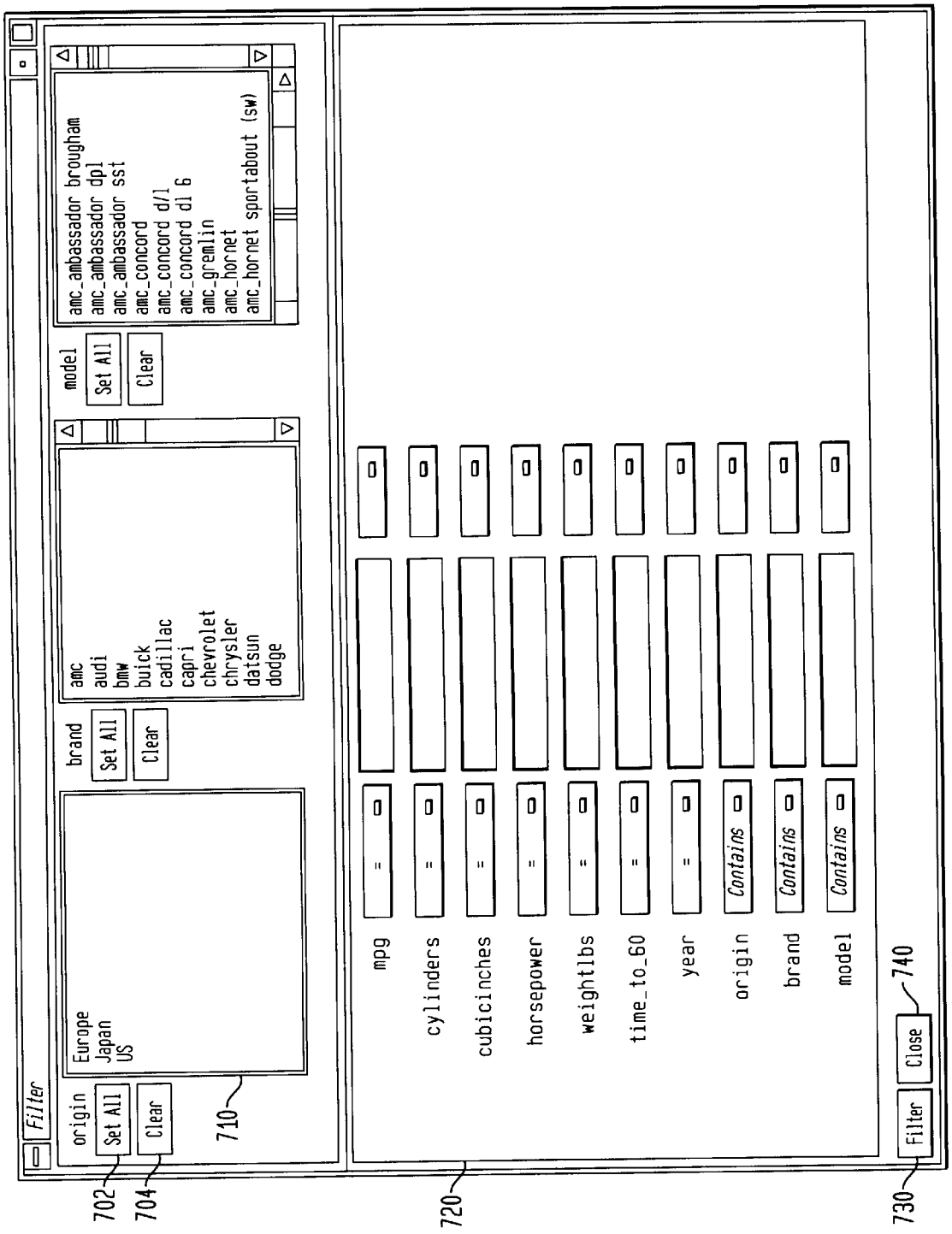
FIG. 7 shows a filter panel for changing the number of displayed entities in a scatter data visualization tool according to the present invention.

As shown in FIG. 7 with reference to data relating to automobiles, a filter panel 700 lets a user input filter criteria to reduce the number of entities displayed in a data visualization. A top window 710 lets a user filter down to specific entities. To select all entities, a user can click All button 702. To clear the current selection, a user can click Clear button 704. To select or deselect an entity, a user can click its name in window 710.

The bottom window 720 lets a user filter based on the values of one or more dependent variables. These include some of the columns in a data file as well as some variables defined in a configuration file. The button next to each variable lets a user choose a filter (!=>, <, >=,<=, Contains, Matches, Equals). The last three filters apply to strings in a configuration file, while the others apply to numbers. Next to each button is a text field to enter the filter threshold value. A user can filter based on any number of variables, including zero. For an object to pass the filter, all the filter conditions must be met (that is, filter conditions are ANDed).

Filter button 730 begins the filtering operation. Close button 740 closes the panel 700.

11. Map Data Visualization Tool Embodiment

Figure 8:
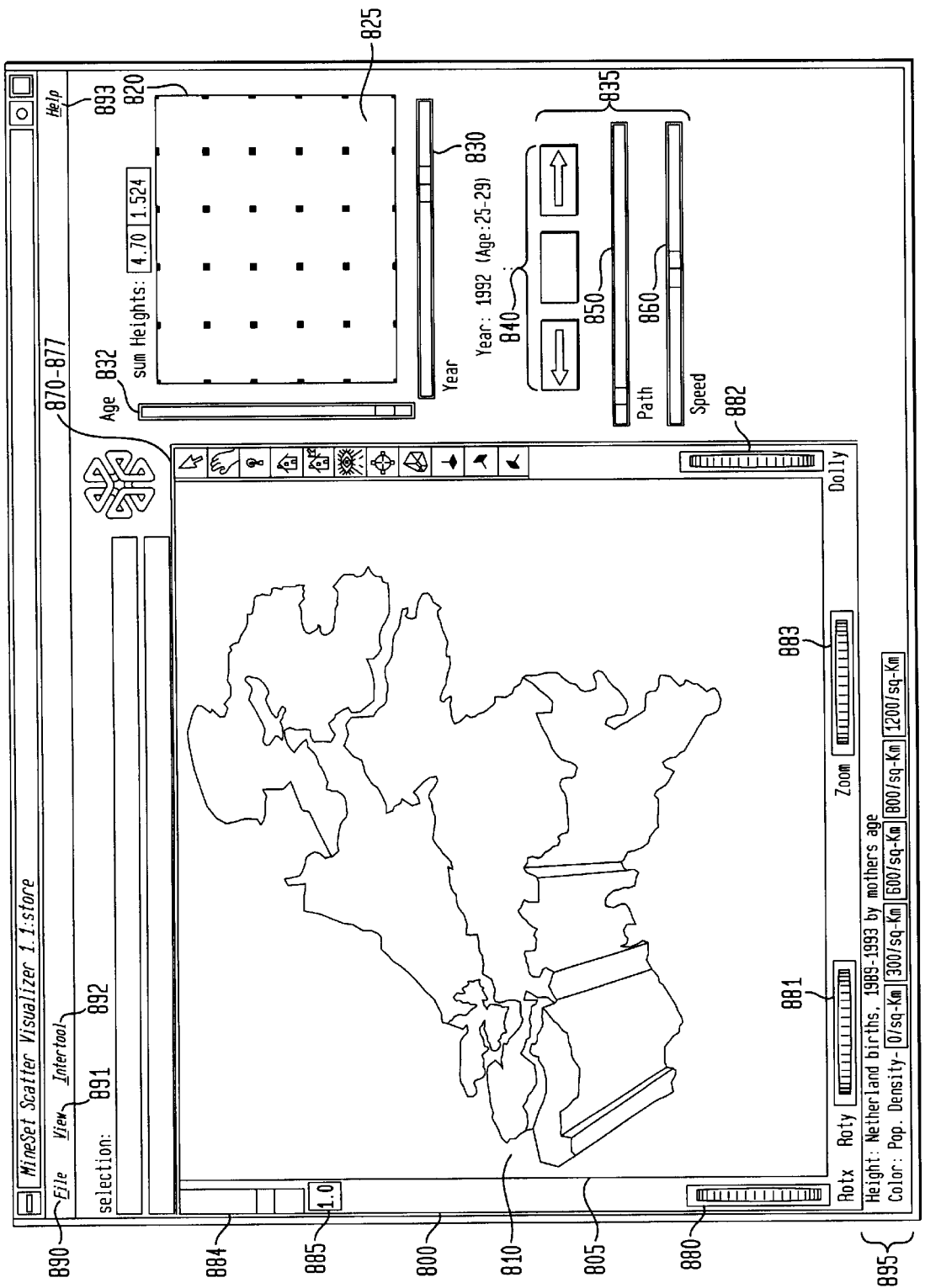
FIG. 8 is a screen display of a map data visualization varied in two external dimensions according to a second embodiment of the present invention.

FIG. 8 shows a screen display 800 of a preferred embodiment of a map data visualization tool according to the present invention. Screen display 800 includes a first display window 805 and a summary window 820. A data visualization 810 is displayed within the first display window 805. In this embodiment, data visualization 810 consists of a "map" data visualization. A map data visualization varies graphical attributes, i.e. height or color, of map objects. The map objects, also called entities, can represent any geographical area. These geographical areas can be defined by known political and/or natural boundaries, such as, continents, countries, states, counties, and any other region. Special user-defined geographical regions or other types of layouts can also be used. For example, floor plans, architectural drawings, distribution networks, and other layouts can be used as a map data visualization.

FIG. 8 is shown with example data related to Netherlands births. In particular, map data visualization 810 consists of a three dimensional graph of different regions in the Netherlands. The height of each region represents the number of births in a given year by mothers in a given mother age. The color of each region represents different population densities. In this case, external dimension space covers data in two external dimensions: time (years, 1989–1993) and age of mother (15–45 years old). At a given instant, data visualization 810 only indicates a snapshot of the number of births and population density for different regions at a given year and age of mothers. Thus, this snapshot does not reveal variations in data across external dimension space, that is, one or more external dimensions.

Summary window 820 contains summary information on the data in map data visualization 810 over the entire external dimension space. Color variations in the summary window 820 highlight changes in the number of births for different years and mother ages. A first slider 830 is provided for varying the map data visualization 810 over the first external dimension (year). A second slider 832 is provided for varying the map data visualization 810 over the first external dimension (age of mothers). Summary window 820 and sliders 830, 832 operate like summary window 220 and sliders 231, 232 described above and do not have to be described in detail. Likewise, grid points 825 are displayed in the summary window 820. When a snap-on-grid mode is enabled, these grid points 825 can represent actual data points to better focus user data queries and navigation paths made through summary window 820, as described above with respect to summary window 220.

The map data visualization tool also includes an animation control panel 835. Like the animation control panel 135, 235 described with respect to the scatter data visualization tool, animation control panel 835 includes tape drive controls 840, a path slider 850, and a speed slider 860 for controlling the animation of the map data visualization 810 across external dimension space, in this case, over first and second external dimensions.

External controls for controlling the display of map data visualization 810 are positioned around the first display window 805. These external controls consist of an array of viewer buttons 870–877, a set of thumb wheels 880–882, and a zoom slider 883 and operate like the corresponding external controls described above with respect to the scatter data visualization tool (e.g., the array of viewer buttons 170–177, a set of thumb wheels 180–182, and a zoom slider 183). A Height-Adjust Slider 884 changes the absolute heights of all graphical objects in display window 805. Label Box 885 displays a height multiplier value associated with the Height-Adjust Slider 884, i.e. a value between 0.1 and 100 with a default value of 1.0.

Like menus 190–193 described above, four pull-down menus 890–893 access all of the map data visualization tool functions. File menu 890 has six command options: Open, Open Other Window, Copy Other Window, Close, and Exit.

Open loads and opens a configuration file. This causes a map data visualization to be displayed that covers data extracted from a data source according to the selected configuration file. Previously displayed data in the display window 805 is discarded. Use Open to view a new data set, or to view the same data set after changing its configuration.

Open Other Window opens a configuration file and displays its results in a different, new second display window. The current data set in the first window, e.g. window 805, remains open.

Copy Other Window opens a new second display window displaying the same data set currently displayed in a first display window. A user can interact with multiple display windows independently or can synchronize these windows using an InterTool pulldown menu 892, as described below.

Close closes the current display window and all associated panels. If no other display windows are open, Close exists the application.

Exit closes all windows and exits the map data visualization tool.

View menu 891 drops down to provide five command options: Show Window Decoration, Show Animation Panel, Show Data Points, Use Random Colors, and Display X-Y Coordinates:

Show Window Decoration lets a user hide or show the external controls around the first display window 805.

Show Animation Panel lets a user hide or show the animation control panel 835. Hiding the animation control panel 835 can be helpful when the Synchronize All Map Viz Sliders option (described below) is selected.

Show Data Points toggles a "snap-on-grid" mode that lets a user hide or show the grid points 825 in the summary window 820. Separate controls, e.g. buttons, or menu or keyboard commands (not shown), can be provided for controlling separately the visual and/or algorithmic operation of the snap-on-grid mode.

Use Random Colors causes the configuration file's color mapping specifications (for example, white-to-red shadings representing population density) to be ignored. Random, constant colors are assigned to the graphical objects. This option can be selected again to toggle back to color mapping specifications defined in the configuration file.

Display X-Y Coordinates puts the map data visualization tool into a special mode that lets a user identify X-Y vertex pairs at specific points of the scene in the main display window 805. In this mode, the map data visualization tool resets the cursor to select mode and displays 3-D objects as flat background lines. Clicking the left mouse button on various parts of the displayed scene causes the corresponding X-Y vertex pair values to appear in a Selection Details window. A user can also enter the vertex pair points into a geography or .gfx file (described below) to identify point objects or the endpoints of line objects for subsequent display. Note that displaying X-Y coordinates is used primarily for developing and refining geography files, not for data analysis.

When Display X-Y Coordinates mode is initially enabled, or when a point in the background is selected, a display selection window shows the minimum and maximum X-Y pairs of the currently displayed image in the main window. Add these two value pairs to the new geography file being generated. For example, min-max pairs of a usa.states.gfx file describing the geography of U.S. states can be entered into an associated usa.cities.gfx file describing the geography of U.S. cities. This ensures that the X-Y coordinate pairs in usa.cities.gfx share the same coordinate system as the X-Y coordinate pairs in usa.states.gfx.

InterTool menu 892 brings up a Synchronize All MapViz Sliders command option. Selecting Synchronize All Mapviz Sliders identifies a map data visualization tool window, e.g. 805, as one in a "synchronized sliders" cooperative mode. By setting multiple display windows to a synchronized sliders cooperative mode, a single set of sliders 831, 832 and a single animation control panel 835 can be used to control data queries and navigation for all of the selected and synchronized windows. In the synchronized sliders mode, changing the current slider positions for one display window will effect the same change in all other synchronized display windows that are currently open. This menu option must be selected in every map data visualization tool window that is to be part of the synchronization and can be used to de-select windows as well.

In one example, only the sliders' physical positions are synchronized, not the underlying meanings of those positions. Accordingly, in this example, synchronization is most useful when the sliders of each data set represent the same range of independent variables. For example, synchronizing two map visualizations on U.S. population data population.usa.mapviz (with dates ranging from 1770 to 1990) and Canadian population data population.canada.mapviz (with dates ranging from 1871 to 1991) probably is not useful, since the slider physical midpoint position represents 1880 in the United States and 1931 in Canada.

Help Menu 893 drops down five command options: Click for Help, Overview, Index, Keys & Shortcuts, and Product Information.

Click for Help turns the cursor into a question mark. Placing this cursor over an object in a display window 805 and clicking the mouse causes a help screen to appear; this screen contains information about that object. Closing the help window restores the cursor to its arrow form and deselects the help function. Note a keyboard shortcut can also be used for this function (e.g. pressing Shift+F1, or alternatively, placing the arrow cursor over an object and pressing the F1 function key to access a help screen about that object).

Overview provides a brief summary about major functions of the map data visualization tool, including how to open a file and how to interact with the resulting display view.

Index provides an index of the complete help system.

Keys & Shortcuts provides the keyboard shortcuts for all map data visualization tool functions that have accelerator keys.

Product Information brings up a screen with the version number and copyright notice for the map data visualization tool.

Figure 9:
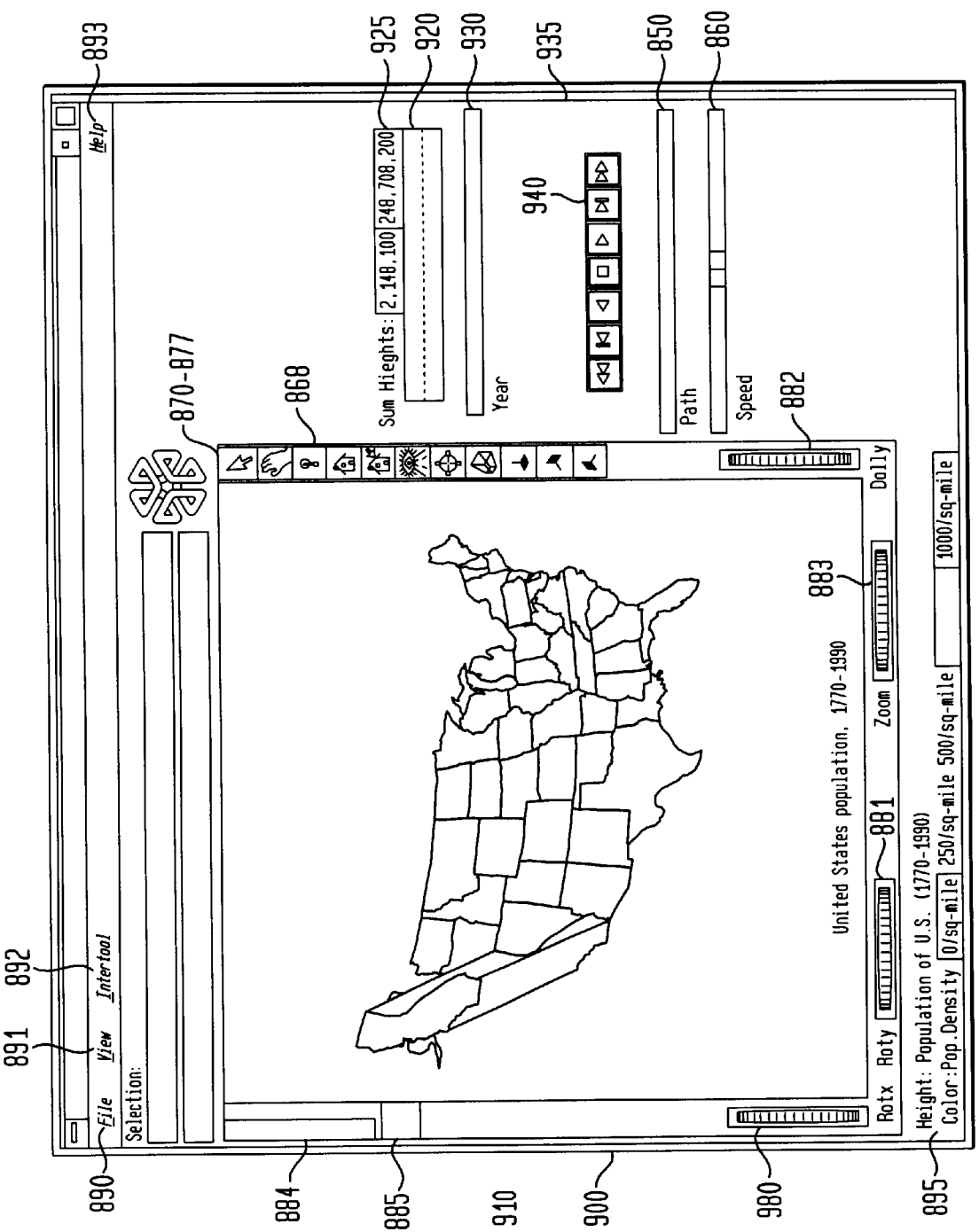
FIGS. 9, 10 and 11 illustrate different examples of map data visualizations which can be used in the present invention.
Figure 10:
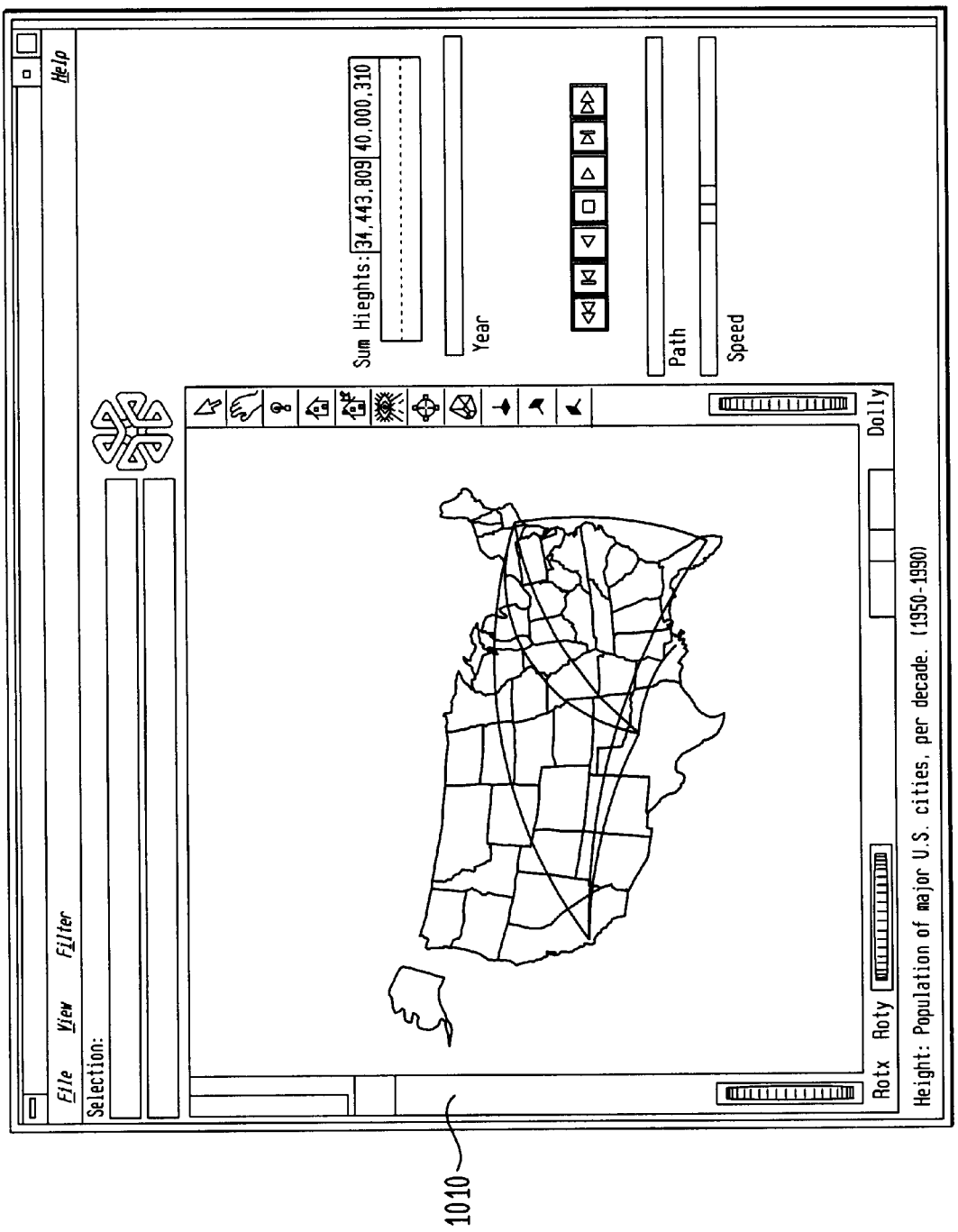
Figure 11:
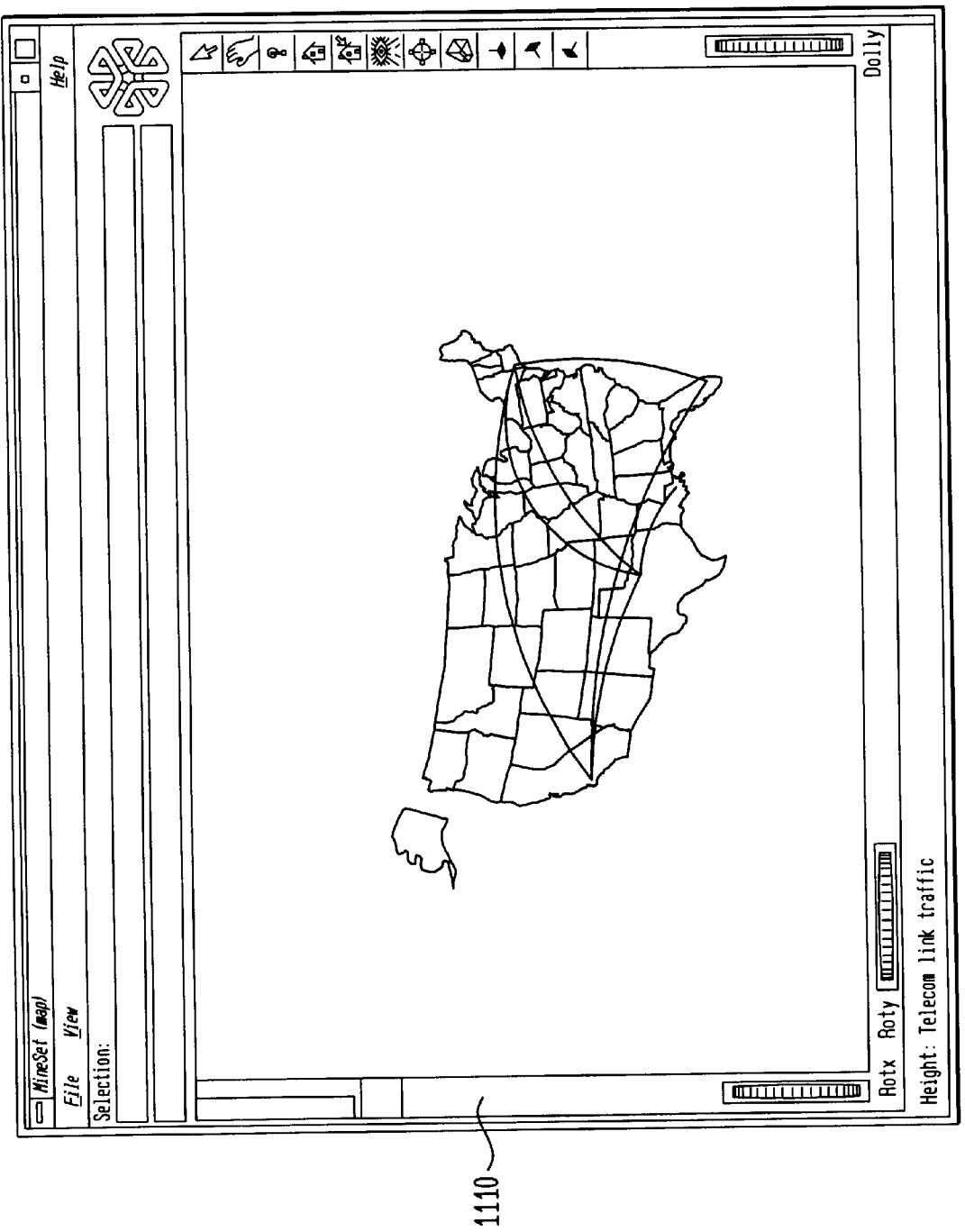

Although FIG. 8 is shown with a two-dimensional summary window 820, a one-dimensional summary window covering one external dimension can used as described earlier with respect to FIG. 1. Other graphical attributes and forms of map data visualization can be used as well. FIGS. 9 to 11 show three more examples of a map data visualization tool according to the present invention. Like FIGS. 1, 2, and 8, FIGS. 9 to 11 are provided as illustrative examples of the present invention and are not intended to exclude equivalent structure or function, nor to limit the present invention.

FIG. 9 shows a display 900 in an example of a map data visualization tool according to the present invention using a one-dimensional summary window 920 and one external slider 930. In the FIG. 9 example, a map data visualization 910 displays data on the U.S. population between the years 1770 and 1990. Twenty-two grid points 925 are shown in the summary window 920 representing actual data points for twenty-one year intervals. A graphical attribute, e.g. color, is used in the summary window 920 as a function of the U.S. population data. For example, color varies from white to red in the summary window 920 as the U.S. population total varies from 2,148,100 to 248,708,200. Preferably, interpolated values are used between actual data points to create a smooth indication in the summary window 920 of changes in the U.S. population across external dimension space.

Note also the animation control panel 935 includes tape drive controls 940 having seven buttons for controlling an animation of map data visualization 910 in fast-forward, single frame forward, forward, pause, reverse, single frame reverse, fast-reverse modes. Otherwise, the operation of the map data visualization tool in FIG. 9 is essentially the same as that of FIG. 8 as indicated by the like reference numerals.

In FIGS. 8 and 9, the height of the entire geographical area is raised or lowered to represent a data variable. FIG. 10 shows an example of a map data visualization 1010 for data on the population of major U.S. cities. In this case, the map data visualization 1010 is a planar landscape where geographic objects (e.g. states) are drawn as simple outlines in a flat plane. Bar-chart type columns (e.g. rods, cylinders, etc.) are placed at specific spots corresponding approximately to city locations.

FIG. 11 shows an example of a map data visualization 1110 for data representing the telecommunication link traffic between selected U.S. cities. In this case, the map data visualization 1110 is a planar landscape where geographic objects (e.g. states) are drawn as simple outlines in a flat plane. Lines have endpoints at specific city locations. Graphical attributes of the lines (e.g. color and width) are used to represent one or more different independent data variables regarding link traffic, such as, link traffic volume and/or type information.

12. Example Map Data Visualizer Tool Implementation

As would be apparent to one skilled in the art given this description, the map data visualization tool can be implemented in the example GUI computer environment and Network environment described above with reference to FIGS. 3 and 4. Four types of files are needed to facilitate map data visualization: data files, geography files (also called gfx files), hierarchy files, and configuration files. A data file consists of rows and tab-separated fields, as described previously with respect to the scatter data visualization tool. Data files can be created using a Tool Manager or other software application or input directly by a user. Data files are the result of extracting raw data from a source (such as, any relational database (e.g. an Oracle, Informix, or Sybase database) or non-relational database. The extracted raw data is then formatted to a file form compatible with the map data visualization tool. Preferably, data files have user-defined file names of variable length followed by a common file extension, e.g., filename.data.

Geography files consist of a description of the shapes and location of the 1-, 2-, or 3-dimensional objects, e.g. the continents, countries, states, and other areas, to be displayed in map landscapes. Preferably, geography files have a .gfx extension to their filename. For example, various .gfx files are often prestored and can include the United States to the granularity of states, and Canada to the granularity of provinces. Like data files, geography files can be created using a Tool Manager or other software application or input directly by a user.

Hierarchy files consist of the following: a description of the column names of the various graphical objects to be displayed; the filenames of the .gfx files that describe the locations and shapes of the graphical objects; and an optional description of the hierarchical relationship of the graphical objects, which is used for the drill-down and drill-up functions. Preferably, hierarchy files have a .hierarchy extension to their filename. Like data and geography files, hierarchy files can be created using a Tool Manager or other software application or input directly by a user.

Hierarchy files enable drill down and drill up functionality between different map levels of varying scope and level of detail. This means that information associated with objects at one level can be aggregated (or, conversely, shown in greater detail) and displayed at a different level. For example, a hierarchy file that defines the relationships between states and regions covering multiple states allows data values such as population levels to be displayed quickly at both the individual state level as well as at regional levels. Consider a gfx_files/usa.states.gfx file that describes the shapes of the 50 United States. A gfx_files/usa.states.hierarchy file, then, can be used to describe a hierarchy which groups individual states into larger user-defined regions (e.g. Mid-Atlantic states), regions into even larger East-West areas, and the East-West areas into an aggregated United States.

A configuration file describes the format of the input data and how the input data is to be configured to form a map data visualization, as described previously with respect to the scatter data visualization tool. Configuration files can be created using a Tool Manager or other software application, using an editor (e.g., jot, vi, or Emacs), or input directly by a user. Preferably, configuration files have user-defined file names of variable length followed by a common file extension, e.g., filename.mapviz.

a. Generating a Configuration File

Figure 12:
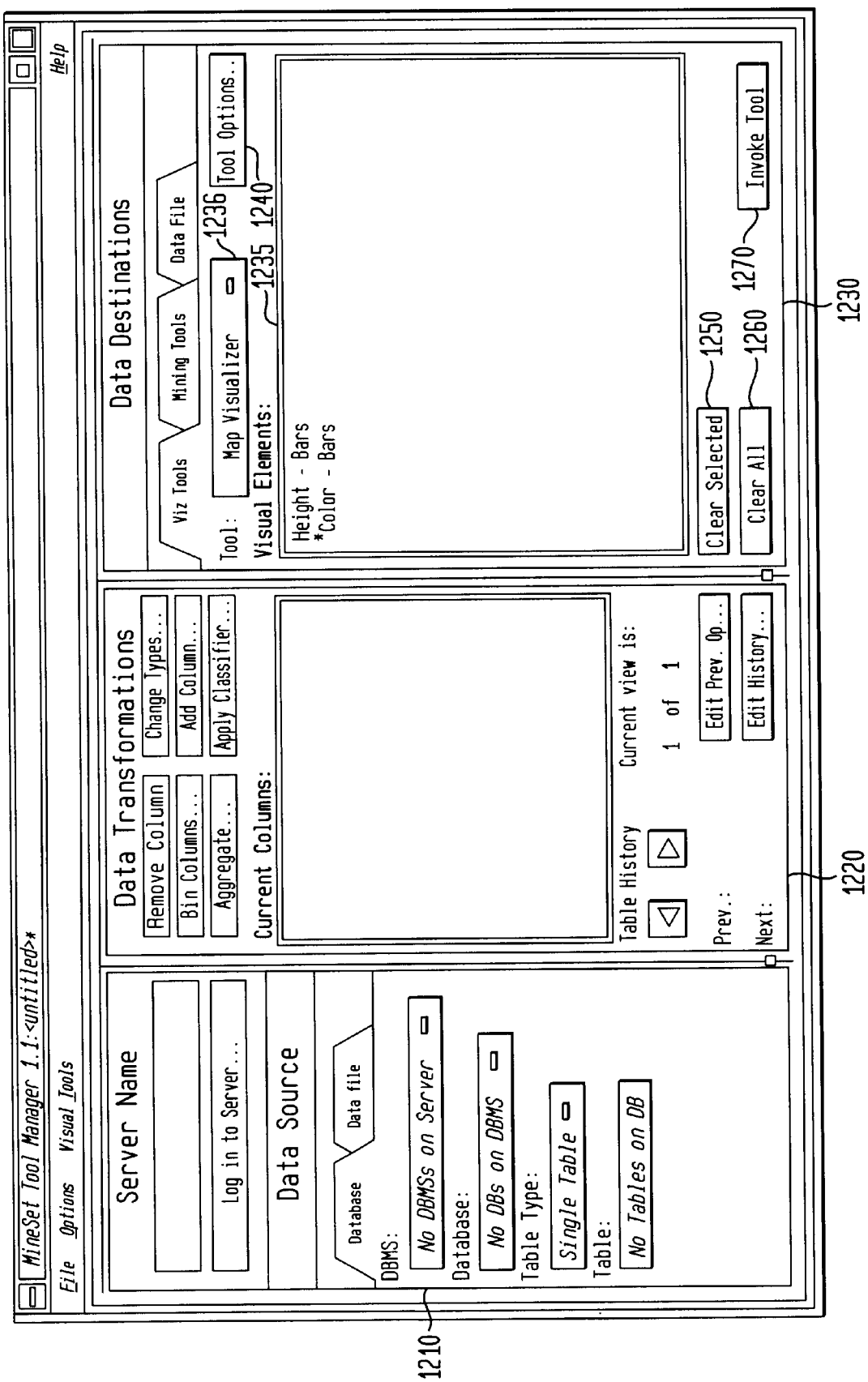
FIG. 12 shows data panels for constructing a map data visualization according to the present invention.

As shown in FIG. 12, data destination panels 1210–1230 can be used to simplify the task of constructing a configuration file for a map data visualization tool. Panels 1210 and 1220 operate substantially like panels 510 and 520 described in detail above. Panel 1230 also operates like panel 530. A visual elements window 1235 lists the one or more graphical attributes (e.g. height of bars and color of bars) associated with objects in a map data visualization. Optional items are preceded by an asterisk. Clicking Height-Bars lets a user specify the heights of geographies bars on a map data visualization. Clicking Color-Bars lets a user assign colors to the geographic bars.

The configuration file also identifies mapping requirements between data attributes, i.e., one or more columns of data in a data file, and graphical attributes. This can be done by assigning one or more selected visual elements from the panel 1235 to one or more columns of data. For example, using a U.S. population data file (population.usa.tab.data file having two data columns population(float[]) and sqMiles (float)) for the data values, a user can map visual element requirements to columns by selecting an element in the Visual Elements window 1235 and then selecting a column name from a listing of the two data columns or entering the column name directly if known. In particular, Height-Bars can be mapped to the population(float[]) column so that the heights of bars on a U.S. map will correspond to the population of the states the bars are located. *Color-Bars can be optionally mapped to the sqMiles (float) column so that the color of bars on a U.S. map will correspond to the area in square miles of the states the bars are located.

Control buttons 1236–1270 are also included in panel 1230. Map Visualizer button 1236 indicates the map data visualization tool is invoked. Tool Options button 1240 displays the Options dialog box 1300 described in more detail below. Clear Selected button 1250 clears a selected map data assignment. Clear All button 1260 clears all mapping assignments between graphical attributes and map data. Invoke Tool button 1270 can be pressed after a configuration file is saved to see the map data visualization corresponding to the saved configuration file.

While panels 1210–1230 reduce the work in creating a configuration file, a configuration file can be constructed manually using a text editor.

b. Map Data Visualization Display Tool Options

Figure 13:
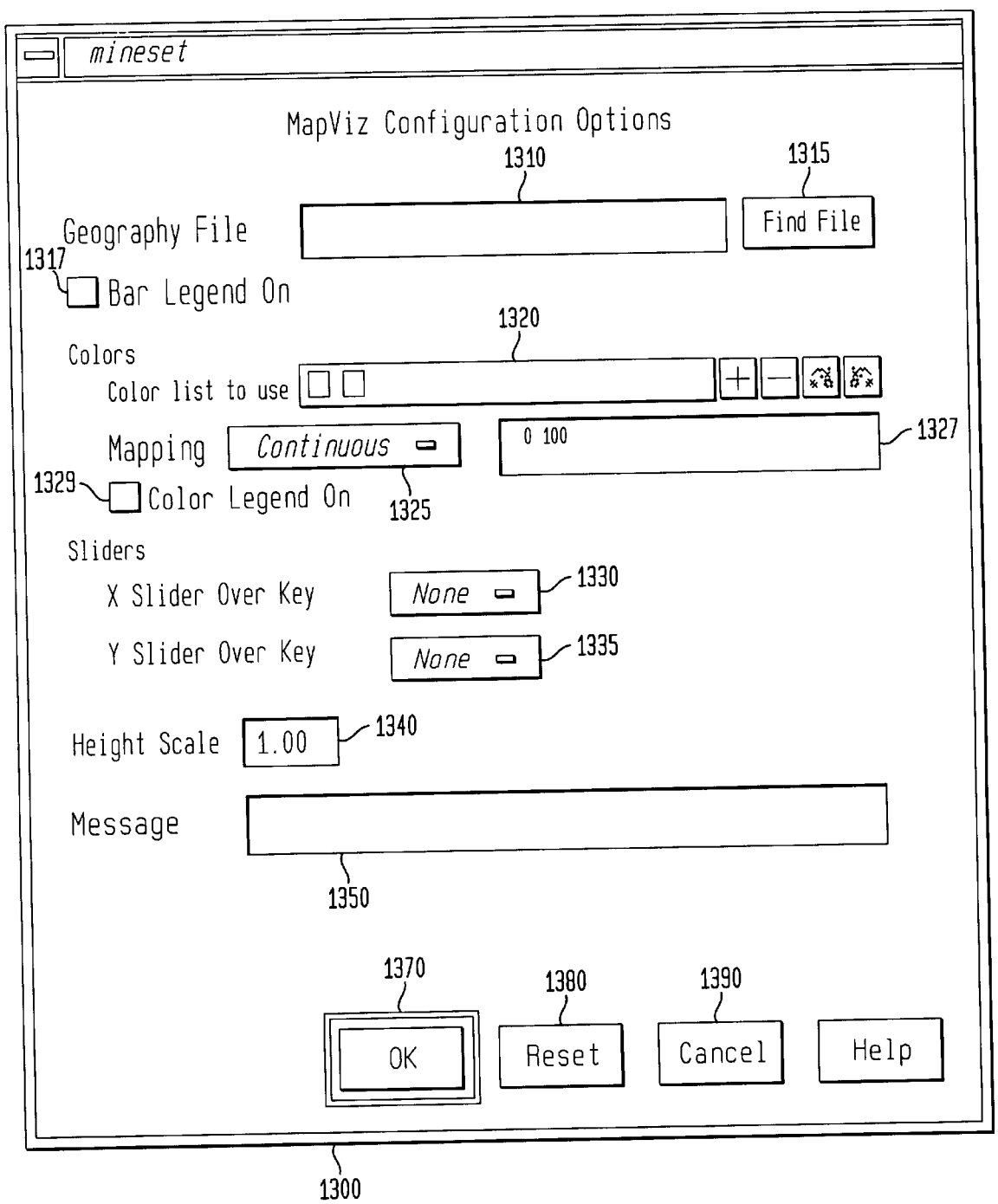
FIG. 13 shows a dialog box for changing map data visualization tool default parameters according to the present invention.

FIG. 13 shows an Options dialog box 1300 that permits a user to change at least some of the map data visualization tool options from their default values. Geography file window 1310 lets a user specify one or more geography and/or hierarchy files to be used for the representation of the geographical objects in the map data visualization tool's display windows, e.g. main display window 805. The Find File button 1315 lets a user browse files to find available the geography and/or hierarchy files to be used. The Bar Legend On button 1317 toggles between displaying or hiding a height legend. A field (not shown) can be provided next to the button 1317 to let a user enter text for the height legend label.

Color options for controlling color display in a map data visualization are available provided that the *Color-Bars mapping in the panel 1200 has been previously performed as described above. A Color List to Use window 1320 enables a user to enter color names or components that specify the colors to be used for geographical objects. Color swatches and other color tools can be used to facilitate color selection. Preferably, color names follow the naming convention of the X window system, except that the names must be in quotes. The default color value is "gray." Examples of valid colors are "green," "Hot Pink," and "#77ff42." The latter is in the form "#rrggbb", in which the red, green, and blue components of the color are specified in hexadecimal value. Pure saturation is represented by ff, a lack of color by 00. For example, "#000000" is black, "#ffffff" is white, "#ff0000" is red, and "#00ffff" is cyan.

Color Mapping window 1325 specifies whether the color change that is shown in the summary window is Continuous or Discrete. Color Mapping Range window 1327 allows a range of values to be used in determining colors for visual elements (e.g. geographic objects) to be entered. If Continuous color mapping is chosen, the color values shift gradually between the colors entered in the Color List to Use field 1320 as a function of the data values that are mapped to those colors. When Discrete color mapping is selected, the colors change in discrete intervals.

For example, with respect to the map data visualization 910 for U.S. population data between 1770–1990, if a user entered "gray" and "red" into the Color List to Use field 1320, selected Discrete in the color mapping button 1325, and entered the values 0 to 150000 in the color mapping range window 1327, then the map data visualization 910 would show states with more than 150,000 square miles are shown in red, the rest are in gray. On the other hand, if a user entered "gray" and "red" into the Color List to Use field 1320, selected Continuous in the color mapping button 1325, and entered the values 0 and 300000 in the color mapping range window 1327, then the map data visualization 910 would show states in colors varying from gray to red as a function of their square area. The larger states would be shown with the greatest density of red and smallest density of grey. Conversely, the smaller states would be shown with the least density of red and greatest density of grey.

The Color Legend On button 1329 lets a user determine whether a color legend is displayed or hidden. A field (not shown) next to button 1329 can be provided to let a user enter text for the color legend label.

X and Y Sliders Options buttons 1330 and 1335 allow data arrays to be mapped to external X and Y sliders (e.g. 830, 832) as described above. If an array of values is to be mapped to the height or color requirements of geographic objects (or bars, lines, or other objects associated with the geographic objects), an X or Y slider must be specified. If the array is a 2-D array and changes in the two external dimensions are to be viewed separately in the summary window, two X and Y sliders must be specified. The popup buttons next to these options provide a list of available array keys over which the sliders operate. If both the X and Y sliders have None selected as their key, the resulting display does not include animation.

Height Scale field 1340 lets a user enter a value by which the height values are scaled in a map data visualization display. Normally, the height variable is mapped directly to the height of the graphical objects, so that the tallest object (with the largest numeric value) rises towards the top of a display window, e.g., window 805. Entering a height scale value in field 1340 causes all objects in the display to be multiplied by that value. Message window 1350 lets a user specify the message displayed when an entity is selected.

Finally, an OK button 1370 permits a user to save selected changes to default parameters and exit the box 1300. Reset Options button 1380 permits a user to reset changes in parameters in box 1300 to initial default parameters. Cancel button 1390 permits a user to exit box 1300 without saving any changes to default parameters.

In one example, the map data visualization tool is a software application. Two files that define the graphical objects to be displayed are needed: (1) one or more .gfx files which define the shapes of the graphical objects displayed and (2) one or more .hierarchy files which describe the relationship of multiple, interrelated map (.gfx) files. These .gfx and .hierarchy files either they must already exist as part of an existing file library or must be created by the user. In one example, a file library includes .gfx and .hierarchy files covering:

- the individual states of the United States
- the individual counties of the United States
- the individual 5-digit zipcodes of the United States
- the telephone area codes of the United States
- the individual provinces and territories of Canada
- the individual states of Mexico
- the individual states and territories of Australia
- the individual countries of Western and Central Europe
- regional subdivisions of both France and The Netherlands The map visualizer tool application further requires a data file with one column indicating geographical object (for example, states). Each row in this column indicates a unique geographical object (staying with the example, this means one row for each state). The data file further must have at least one column with numeric values mapped (using arithmetic expressions) to the heights and/or colors of each geographic bar. These columns can be scalar, a 1-D array, or a 2-D array. If the column is an array, a slider must be used to select specific data points for this mapping to heights and colors. If both heights and colors are mapped to 1-D or 2-D arrays, the arrays have the same indexes.

13. Representation of Null Data

Nulls represent unknown data. According to a further feature of the present invention, the presence of nulls are represented visually in the summary window and/or in the data visualization. Special null positions can also be provided along one or more external dimension sliders (i.e. at the end of the slider) for providing summary information on data records having null values along those external dimensions. These features can be used in both scatter and map data visualization.

Nulls can occur when the database or data file contains a null, that is, a data value in a record, field, or item is unknown, not-applicable, unavailable, etc. For example, in FIG. 1, if there is no data on alcohol sales to 18 year-olds, then a column of data would include a null value. When a null value is mapped to a visual element in a data visualization, special representations are used depending upon the visual elements. For example, a null height can be shown by a dark grey object with zero height; a null color value results in an object with appropriate height (as defined by the value mapped to height), but with a dark grey color. Also, if null is mapped to height, the object can be drawn in an outline mode.

When a null value is mapped to summary information in a summary window, a visual null representation can be used to indicate null data such as a special mark (e.g., "?"), text (e.g., "NULL"), a distinct color, or any other distinctive graphical representation (e.g.,flag, hill, icon). Different types of null summary values (unknown, not-applicable, etc.) can have the same or different visual null representation.

As mentioned above, special null positions can also be provided along one or more external dimension sliders (i.e. at the end of the slider) for providing summary information on data records having null values along those external dimensions. For example, in FIG. 1, an extra month can be added to the beginning (or end) of slider 130. This extra month can be used to provide summary information in summary window 125 on data records having null values. This summary information in the extra month might represent the total number of nulls along the external dimension or other available data or aggregated data from the data records having null values. In the case of two external dimensions, special null positions can be provided independently on each external slider (i.e. 230, 232).

14. Conclusion

As described above, the first embodiment of a data visualization tool according to the present invention involved a "scatter"-type data visualization 110, 210. The second embodiment was described with respect to a "map" type data visualization 810–1110. The summary window and animation control panel of the present invention, however, are not limited solely to use with a scatter data visualization and/or a map data visualization. As would be apparent to one skilled in the art given this description, the summary window and/or animation control panel can be used as a data visualization tool with any type of data visualization for any type of data.

Moreover, the use of data files and configuration files are provided as examples and are not intended to limit the present invention. As would have been obvious to a person skilled in the art given this description, data visualizations can be generated from a data source in any known or equivalent manner with or without data files and configuration files.

In the above description, the summary window and animation control panel are used to control a data visualization on a computer graphics display. The summary window and animation control, as described herein, can also be used to drive a controller for controlling a physical model or any other apparatus or means for representing data.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer graphics display system for controlling data visualization in at least one external dimension using a graphical user-interface, comprising:

a first display window for displaying a data visualization;

a summary display window containing a summary of data for said data visualization over at least one external dimension;

means for permitting a user to select a path in said summary window to navigate through said data visualization over said at least one external dimension;

means for displaying an animation of said data visualization based on said selected path, wherein said animation is displayed over actual and interpolated data points approximately along said selected path with respect to said summary window; and means for permitting the user to pause said animation, wherein said paused animation is displayed over the closest actual points along said selected path with respect to said summary window.

2. The system of claim 1, wherein said means for permitting the user to select said path includes permitting the user to select a path by selecting start and end points in said summary window.

3. The system of claim 1, wherein said means for permitting the user to select said path includes permitting the user to select a path by tracing a free-form path in said summary window.

4. The system of claim 1, wherein said means for permitting the user to select said path includes permitting the user to select a path by selecting a start point in said summary window and moving at least one of said first and second controllers to direct said path.

5. The system of claim 1, wherein said means for permitting the user to select said path includes permitting the user to select a predefined path.

6. The system of claim 1, further comprising an animation control panel for controlling animation of said data visualization along a path through said at least one external dimension.

7. The system of claim 1, wherein said data visualization includes at least one of a map, graph, chart, histogram, figure, virtual reality data representation, information landscape, hierarchy, and tree.

8. A method for controlling data visualization in at least one external dimension using a graphical user-interface, comprising the steps of:

displaying a data visualization in a first display window;

displaying a summary of data for said data visualization over said at least one external dimension in a summary display window;

permitting a user to select a path in said summary window to navigate through said data visualization over said at least one external dimension;

displaying an animation of said data visualization based on said selected path, wherein said animation is displayed over actual and interpolated data points approximately along said selected path made with respect to said summary window; and permitting the user to pause said animation, wherein said paused animation is displayed over the closest actual data points along said selected path with respect to said summary window.

9. The method of claim 8, wherein the step of permitting the user to select said path includes permitting the user to select a path by selecting start and end points in said summary window.

10. The method of claim 8, wherein the step of permitting the user to select said path includes permitting the user to select a path by tracing a free-form path in said summary window.

11. The method of claim 8, wherein the step of permitting the user to select said path includes permitting the user to select a path by selecting a start point in said summary window and moving at least one of said first and second controllers to direct said path.

12. The method of claim 8, wherein the step of permitting the user to select said path includes permitting the user to select a predefined path.

13. The method of claim 8, wherein the step of permitting the user to select said path includes an animation control panel.

14. The method of claim 8, wherein said data visualization includes at least one of a map, graph, chart, histogram, figure, virtual reality data representation, information landscape, hierarchy, and tree.

15. A system for controlling data visualization in at least one external dimension using a graphical user-interface, comprising:

means for displaying a data visualization in a first display window;

means for displaying a summary of data for said data visualization over said at least one external dimension in a summary display window;

means for permitting a user to select a path in said summary window to navigate through said data visualization over said at least one external dimension;

means for displaying an animation of said datam visualization based on said selected path, wherein said animation is displayed over actual and interpolated data points approximately along said selected path made with respect to said summary window; and means for permitting the user to pause said animation, wherein said paused animation is displayed over the closest actual data points along said selected path with respect to said summary window.

16. The system of claim 15, wherein said means for permitting the user to select said path includes means for permitting the user to select a path by selecting start and end points in said summary window.

17. The system of claim 15, wherein said means for permitting the user to select said path includes means for permitting the user to select a path by tracing a free-form path in said summary window.

18. The system of claim 15, wherein said means for permitting the user to select said path includes means for permitting the user to select a path by selecting a start point in said summary window and means for moving at least one of said first and second controllers to direct said path.

19. The system of claim 15, wherein said means for permitting the user to select said path includes means for permitting the user to select a predefined path.

20. The system of claim 15, wherein said means for permitting the user to select said path includes an animation control panel.

21. The system of claim 15, wherein said data visualization includes at least one of a map, graph, chart, histogram, figure, virtual reality data representation, information landscape, hierarchy, and tree.

22. A computer program product comprising a computer useable medium having computer program logic recorded thereon for enabling a processor in a computer system to control a data visualization in at least one external dimension using a graphical user-interface, the computer programm logic comprising:

- means for enabling the processor to display a data visualization in a first display window;
- means for enabling the processor to display a summary of data for said data visualization over said at least one external dimension in a summary display window;
- means for enabling the processor to permit a user to select a path in said summary window to navigate through said data visualization over said at least one external dimension;
- means for enabling the processor to display an animation of said data visualization based on said selected path, wherein said animation is displayed over actual and interpolated data points approximately along said selected path made with respect to said summary window; and
- means for enabling the processor to permit the user to pause said animation, wherein said paused animation is displayed over the closest actual data points along said selected path with respect to said summary window.

23. The computer program product of claim 22, wherein said means for enabling the processor to permit the user to select said path includes means for enabling the processor to permit the user to select a path by selecting start and end points in said summary window.

24. The computer program product of claim 22, wherein said means for enabling the processor to permit the user to select said path includes means for enabling the processor to permit the user to select a path by tracing a free-form path in said summary window.

25. The computer program product of claim 22, wherein said means for enabling the processor to permit the user to select said path includes means for enabling the processor to permit the user to select a path by selecting a start point in said summary window and for moving at least one of said first and second controllers to direct said path.

26. The computer program product of claim 22, wherein said means for enabling the processor to permit the user to select said path includes means for enabling the processor to permit the user to select a predefined path.

27. The computer program product of claim 22, wherein said means for enabling the processor to permit the user to select said path includes an animation control panel.

28. The computer program product of claim 22, wherein said data visualization includes at least one of a map, graph, chart, histogram, figure, virtual reality data representation, information landscape, hierarchy, and tree.

* * * * *

UNITED STATES PATENT AND TRADEMARK OFFICE
CERTIFICATE OF CORRECTION

PATENT NO. : 6,480,194 B1
DATED : November 12, 2002
INVENTOR(S) : Sang'udi et al.

It is certified that error appears in the above-identified patent and that said Letters Patent is hereby corrected as shown below:

Column 15,
Line 20, please replace "Wile" with -- While --.

Column 26,
Line 34, please replace "datam" with -- data --.

Column 27,
Lines 3 and 4, please replace "programm" with -- program --.

Signed and Sealed this

Fourteenth Day of October, 2003

JAMES E. ROGAN
*Director of the United States Patent and Trademark Office*